United States Patent
Sajadieh et al.

(10) Patent No.: US 9,461,723 B2
(45) Date of Patent: Oct. 4, 2016

(54) ORTHOLOGONAL BEAMFORMING FOR MULTIPLE USER MULTIPLE-INPUT AND MULTIPLE-OUTPUT (MU-MIMO)

(71) Applicant: INTEL IP CORPORATION, Santa Clara, CA (US)

(72) Inventors: Masoud Sajadieh, Fremont, CA (US); Hooman Shirani-Mehr, Portland, OR (US)

(73) Assignee: INTEL IP CORPORATION, Santa Clara, CA (US)

(*) Notice: Subject to any disclaimer, the term of this patent is extended or adjusted under 35 U.S.C. 154(b) by 22 days.

(21) Appl. No.: 14/125,330

(22) PCT Filed: Jun. 28, 2013

(86) PCT No.: PCT/US2013/048639
§ 371 (c)(1),
(2) Date: Dec. 11, 2013

(87) PCT Pub. No.: WO2014/158208
PCT Pub. Date: Oct. 2, 2014

(65) Prior Publication Data
US 2014/0341048 A1 Nov. 20, 2014

Related U.S. Application Data

(60) Provisional application No. 61/806,821, filed on Mar. 29, 2013.

(51) Int. Cl.
*H04B 7/204* (2006.01)
*H04B 7/04* (2006.01)
(Continued)

(52) U.S. Cl.
CPC ............ *H04B 7/0456* (2013.01); *H04B 1/56* (2013.01); *H04B 7/0417* (2013.01);
(Continued)

(58) Field of Classification Search
CPC .... H04B 7/024; H04B 7/0417; H04B 7/063; H04B 7/0805; H04J 11/0069
See application file for complete search history.

(56) References Cited

U.S. PATENT DOCUMENTS 8,054,837 B2* 11/2011 Zhang ............... H04B 7/0805
370/310
2006/0104382 A1 5/2006 Yang et al.
(Continued)

FOREIGN PATENT DOCUMENTS

KR 10-2012-0033215 A 4/2012
KR 10-2012-0049732 A 5/2012

OTHER PUBLICATIONS

International Search Report and Written Opinion received for PCT Patent Application No. PCT/US2013/048639 mailed on Dec. 27, 2013, 13 Pages.

*Primary Examiner* — Alvin Zhu
(74) *Attorney, Agent, or Firm* — Thorpe North & Western LLP

(57) ABSTRACT

Technology to generate an improved signal-to-interference-plus-noise ratio (SINR) from a set of orthogonal reference signals (RSs) is disclosed. In an example, a user equipment (UE) can include computer circuitry configured to: Receive a set of orthogonal RSs from a node; calculate a SINR for each of the RSs in the set of orthogonal RSs to form a set of SINR; select a maximum SINR from the set of SINR; and quantize the maximum SINR for the set of SINR. Each reference signal can represent a transmission beam direction.

24 Claims, 16 Drawing Sheets

(51) Int. Cl.
- H04L 5/00 (2006.01)
- H04B 1/56 (2006.01)
- H04W 48/16 (2009.01)
- H04W 56/00 (2009.01)
- H04W 76/02 (2009.01)
- H04W 36/30 (2009.01)
- H04W 24/00 (2009.01)
- H04W 36/26 (2009.01)
- H04W 48/18 (2009.01)
- H04W 24/10 (2009.01)
- H04W 36/00 (2009.01)
- H04W 36/22 (2009.01)
- H04L 1/18 (2006.01)
- H04W 24/02 (2009.01)
- H04W 72/04 (2009.01)
- H04W 72/08 (2009.01)
- H04W 28/20 (2009.01)
- H04L 29/06 (2006.01)
- H04L 29/08 (2006.01)
- H04M 1/725 (2006.01)
- H04W 4/02 (2009.01)
- H04W 8/02 (2009.01)
- H04W 8/06 (2009.01)
- H04W 28/02 (2009.01)
- H04B 7/06 (2006.01)
- H04W 48/06 (2009.01)
- H04W 28/08 (2009.01)
- H04W 36/08 (2009.01)
- H04W 48/12 (2009.01)
- H04W 88/08 (2009.01)
- H04W 84/04 (2009.01)
- H04W 88/10 (2009.01)
- H04W 84/12 (2009.01)
- H04W 88/02 (2009.01)

(52) U.S. Cl.
CPC ......... *H04B 7/0617* (2013.01); *H04B 7/0634* (2013.01); *H04L 1/1864* (2013.01); *H04L 5/0048* (2013.01); *H04L 5/0051* (2013.01); *H04L 5/0057* (2013.01); *H04L 5/0073* (2013.01); *H04L 5/0085* (2013.01); *H04L 65/4092* (2013.01); *H04L 65/601* (2013.01); *H04L 65/607* (2013.01); *H04L 65/608* (2013.01); *H04L 65/80* (2013.01); *H04L 67/02* (2013.01); *H04M 1/72522* (2013.01); *H04M 1/72572* (2013.01); *H04W 4/021* (2013.01); *H04W 8/02* (2013.01); *H04W 8/06* (2013.01); *H04W 24/00* (2013.01); *H04W 24/02* (2013.01); *H04W 24/10* (2013.01); *H04W 28/0205* (2013.01); *H04W 28/0226* (2013.01); *H04W 28/0289* (2013.01); *H04W 28/085* (2013.01); *H04W 28/20* (2013.01); *H04W 36/0005* (2013.01); *H04W 36/22* (2013.01); *H04W 36/26* (2013.01); *H04W 36/30* (2013.01); *H04W 48/06* (2013.01); *H04W 48/16* (2013.01); *H04W 48/18* (2013.01); *H04W 56/001* (2013.01); *H04W 72/0446* (2013.01); *H04W 72/082* (2013.01); *H04W 76/021* (2013.01); *H04W 76/023* (2013.01); *H04W 76/025* (2013.01); *H04L 5/0007* (2013.01); *H04W 36/08* (2013.01); *H04W 48/12* (2013.01); *H04W 84/042* (2013.01); *H04W 84/045* (2013.01); *H04W 84/12* (2013.01); *H04W 88/02* (2013.01); *H04W 88/08* (2013.01); *H04W 88/10* (2013.01); *Y02B 60/50* (2013.01)

(56) References Cited

U.S. PATENT DOCUMENTS

| | | | | |
|---|---|---|---|---|
| 2009/0160707 A1* | 6/2009 | Lakkis | ................ | H04B 7/0417 342/367 |
| 2009/0303961 A1* | 12/2009 | Popovic | ............... | H04J 11/0069 370/330 |
| 2012/0087332 A1* | 4/2012 | Kim | ...................... | H04B 7/063 370/329 |
| 2012/0281662 A1 | 11/2012 | Prasad et al. | | |
| 2013/0195080 A1* | 8/2013 | Kang | .................... | H04B 7/024 370/335 |

* cited by examiner

SISO

SIMO

MISO

MIMO

ORTHOGONAL BEAMFORMING FOR MULTIPLE USER MULTIPLE-INPUT AND MULTIPLE-OUTPUT (MU-MIMO)

RELATED APPLICATIONS

This application claims the benefit of and hereby incorporates by reference U.S. Provisional Patent Application Ser. No. 61/806,821, filed Mar. 29, 2013.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission (also known as a broadcast channel (BC)) can be a communication from the node (e.g., eNodeB) to the wireless device (e.g., UE), and the uplink (UL) transmission (also known as a multiple access channel (MAC)) can be a communication from the wireless device to the node.

Downlink and uplink channels or transmissions can use time-division duplexing (TDD) or frequency-division duplexing (FDD). Time-division duplexing (TDD) is an application of time-division multiplexing (TDM) to separate downlink and uplink signals. In TDD, downlink signals and uplink signals may be carried on a same carrier frequency (i.e., shared carrier frequency) where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission can operate using different frequency carriers (i.e. separate carrier frequency for each transmission direction). In FDD, interference can be avoided because the downlink signals use a different frequency carrier from the uplink signals.

The eNB can have multiple antennas used for transmission to the UEs, allowing the eNB to use multiple-input and multiple-output (MIMO). MIMO is a smart antenna technology that refers to the use of multiple antennas at both the transmitter and receiver to improve communication performance, where input and output refer to a radio channel carrying the signal, not necessarily to the devices having antennas. In MIMO, up to eight transmit or receive antennas can be used, or up to eight channels can be used for transmission of a resource.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
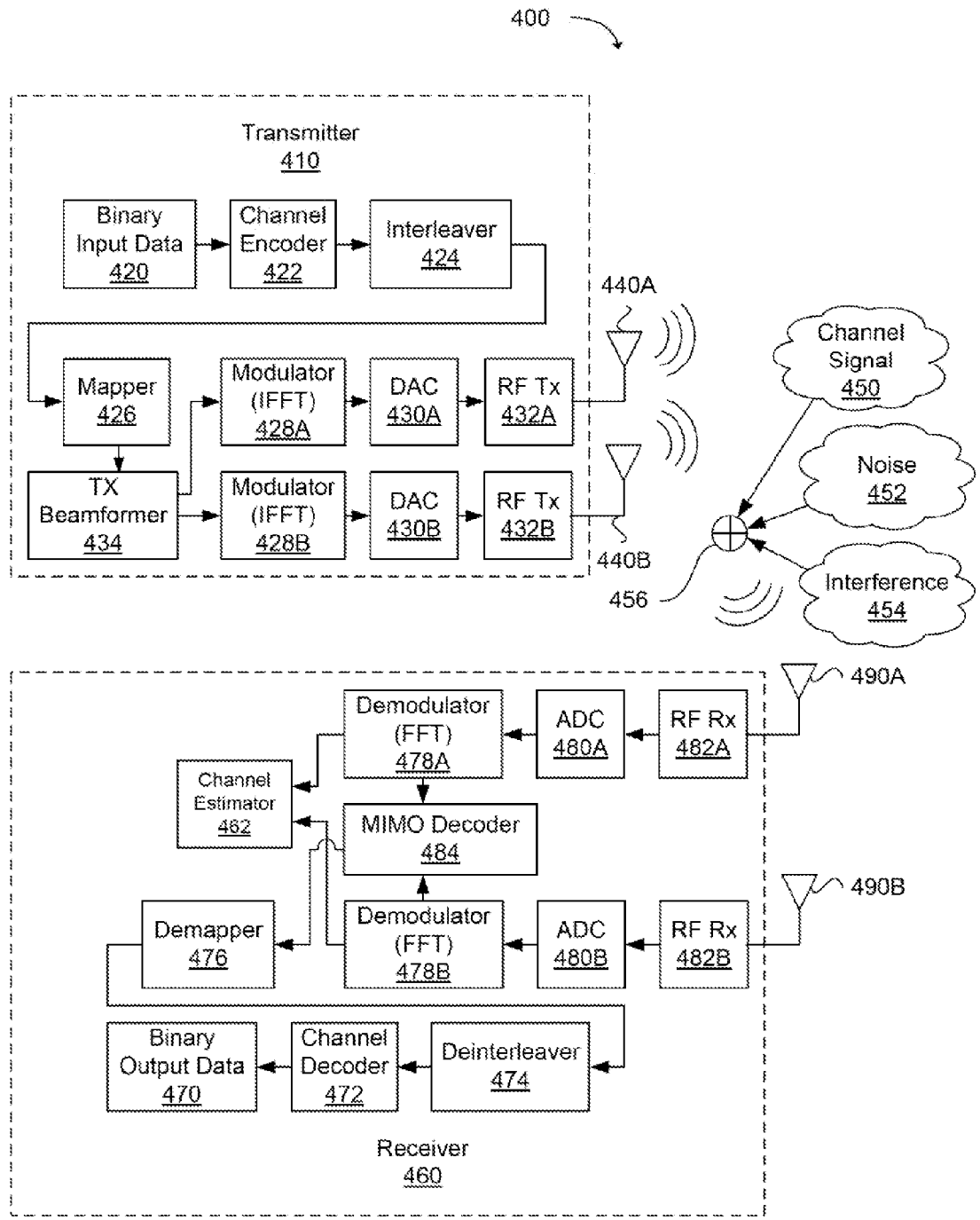
FIG. 1 illustrates a block diagram of the physical layer of a transmitter and receiver in an orthogonal frequency-division multiplexing (OFDM) wireless network in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system 400, as illustrated in FIG. 1. A basic multiple-input multiple-output (MIMO) system is used for simplicity in illustrating the basic hardware transmission components, but the components can also be adapted for a complex MIMO system, a single-input and single-output (SISO) system, or similar system. For example in a MIMO system, at the transmitter 410, binary input data 420 can be protected through encoding using a channel encoder 422, interleaved against fading phenomenon using an interleaver 424, and mapped to improve reliability using a mapper 426. The mapped data can be separated into layers for antenna ports by a transmitter (TX) beamformer 434 and the layers can be OFDM modulated into OFDM symbols using modulators 428A-B. The modulators can use an inverse fast Fourier transform (IFFT) algorithm to compute the inverse discrete Fourier transform (IDFT) to generate modulated signals (vector x for each antenna port). The modulated signals can be converted to analog signals with digital-to-analog converters (DACs) 430A-B. The analog signals can be transmitted via radio frequency (RF) transmitters (Txs) 432A-B configured to send the signal to transmitter antennas 440A-B operable to communicate the signal. The analog signals will follow a path referred to as a channel. The analog signals travelling through that path can be referred to as a channel signal 450. The physical layer can include other components (not shown), such as series-to-parallel (S/P) converters, parallel-to-serial (P/S) converters, cyclic prefix (CP) inserters and deleters, guardband inserters and deleters, and other desired components.

The transmitted channel signal 450 can be subject to noise 452 and interference 454. The interference can include intra-cell interference and intercell interference. Intra-cell interference can refer to interference from other channel signals transmitted within the cell of the transmitter 410. Intercell interference can refer to interference from other channel signals transmitted by neighboring cells. The noise and interference is represented as an addition 456 to the channel signal, which can be received by receiver antennas 490A-B and one or more radio frequency (RF) receivers (Rxs) 482A-B at the receiver 460. The channel signal combined with the noise and interference can be converted to a digital modulated signal with analog-to-digital converters (ADCs) 480A-B. The digital signal can be OFDM demodulated using demodulators 478A-B. The demodulators can use a fast Fourier transform (FFT) algorithm to compute the discrete Fourier transform (DFT) to generate demodulated signals (vector y for each antenna port). A channel estimator 462 can use the demodulated signal to estimate the channel 450 and the noise and interference that occurs in the channel. The channel estimator can include a feedback generator or be in communication with the feedback generator, which can generate a physical uplink shared channel (PUSCH) feedback report, such as a channel quality indicator (CQI) report, a precoding matrix indicator (PMI) report, or a transmission rank indicator (RI) report. The CQI can be used to assist the MIMO transmissions modes. The demodulated signals can be combined using a MIMO decoder 484, demapped using a demapper 476, deinterleaved using a deinterleaver 474, and decoded by a channel decoder 472 to generate binary output data 470 that can be used by other layers of the receiving station.

Figure 2:
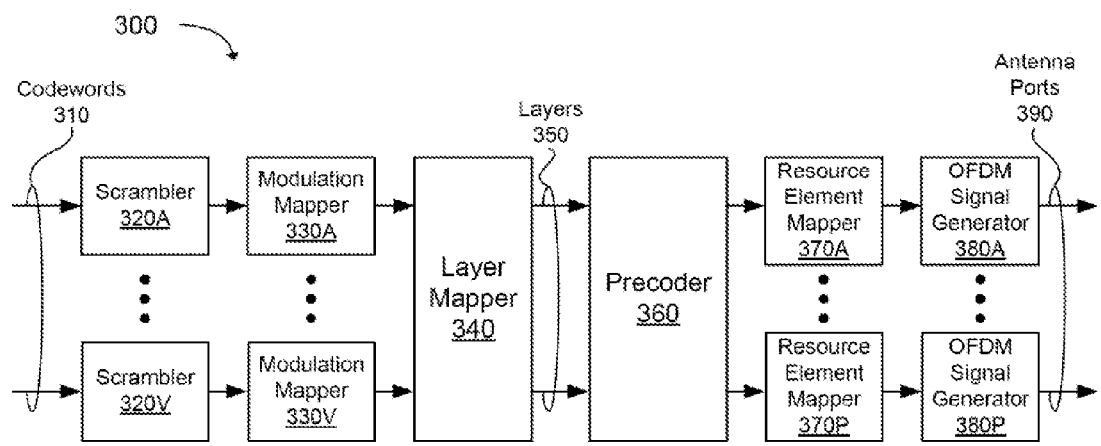
FIG. 2 illustrates a block diagram of physical channel processing of a physical channel processor in accordance with an example.

FIG. 2 illustrates additional details related to the interleaver 424, the mapper 426, the transmitter beamformer 434, and the modulators 428A-B of the physical channel processor shown in FIG. 1 for an LTE MIMO mobile communication system. Corresponding features can also exist on the receiver 460. The MIMO physical channel processor 300 of FIG. 2 can include scramblers 320A-V, modulation mappers 330A-V, a layer mapper 340, a precoder 360, resource element mappers 370A-P, and OFDM signal generators 380A-P. The scramblers can scramble each of the codewords 310 into coded bits to be transmitted on a physical channel. Modulation mappers can modulate scrambled bits to generate complex-valued modulation symbols. A layer mapper can map the modulation symbols onto a plurality of transmission layers 350. The precoder can precode the modulation symbols on each layer for transmission on antenna ports 590. The procoder can use a codebook known both at the transmitter (e.g., eNB) and the receiver (e.g., UE) or be calculated at the transmitter and transferred to or learned at the receiver. The codebook can define a set of vectors and matrices at both the transmitter and the receiver, which can achieve a high precoding gain, lower feedback overhead, and provide flexibility to support various antenna configurations and different numbers of data streams. The resource element mappers can map the modulation symbols for each antenna port to resource elements (REs). The OFDM signal generator can generate a complex-valued time-domain OFDM signal for each antenna port.

Figure 3:
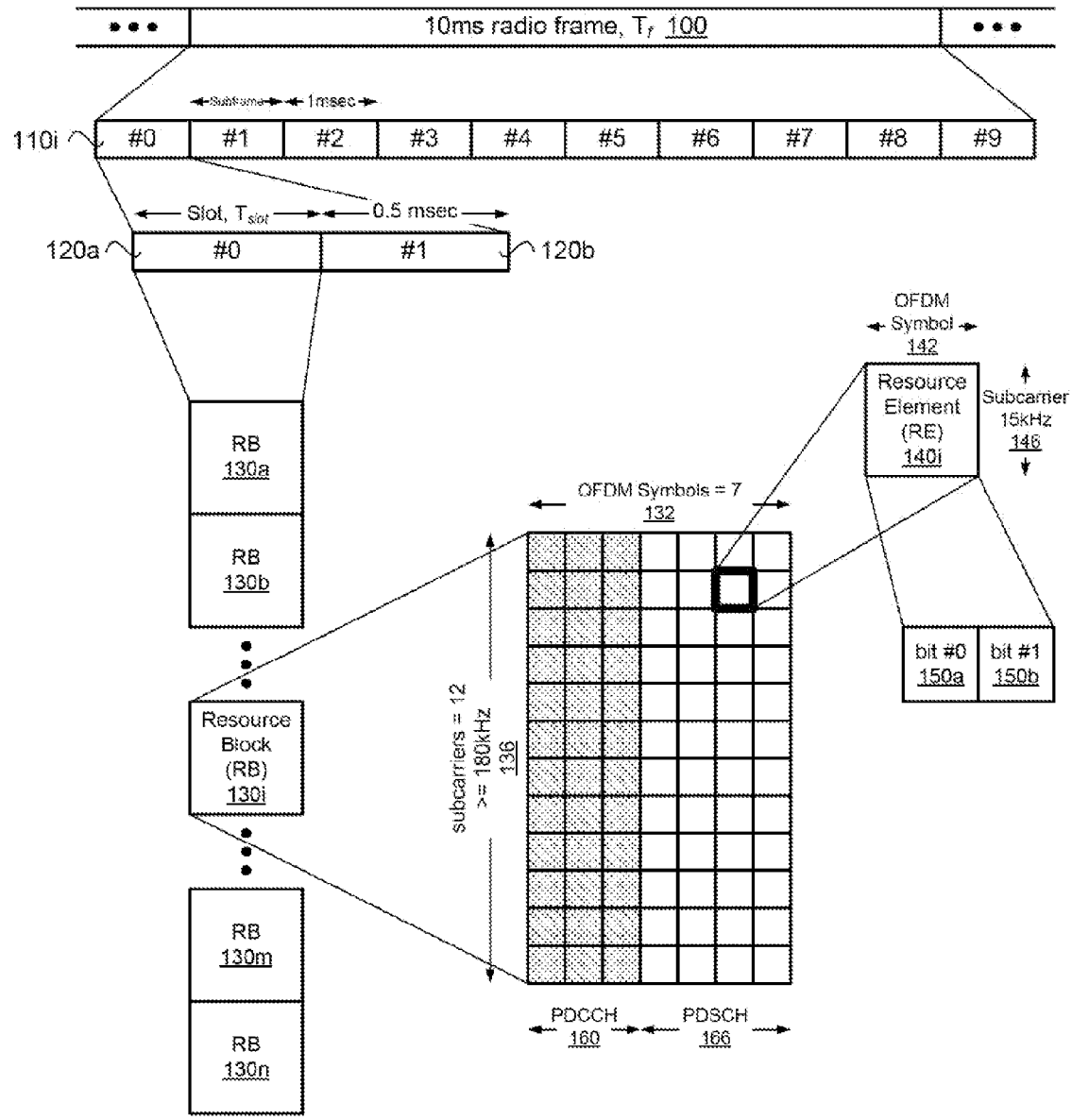
FIG. 3 illustrates a diagram of radio frame resources (e.g., a resource grid) for a downlink (DL) transmission including a legacy physical downlink control channel (PDCCH) in accordance with an example.

In one example, the resource elements (REs) can represent elements of a radio frame structure transmitted on the physical (PHY) layer in a downlink transmission between a node (e.g., eNodeB) and the wireless device (e.g., UE) using a generic 3GPP long term evolution (LTE) frame structure, as illustrated in FIG. 3.

FIG. 3 illustrates a downlink radio frame structure type 1. In the example, a radio frame 100 of a signal used to transmit the data can be configured to have a duration, Tf, of 10 milliseconds (ms). Each radio frame can be segmented or divided into ten subframes 110i that are each 1 ms long. Each subframe can be further subdivided into two slots 120a and 120b, each with a duration, Tslot, of 0.5 ms. The first slot (#0) 120a can include a legacy physical downlink control channel (PDCCH) 160 and/or a physical downlink shared channel (PDSCH) 166, and the second slot (#1) 120b can include data transmitted using the PDSCH.

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130i can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 4A:
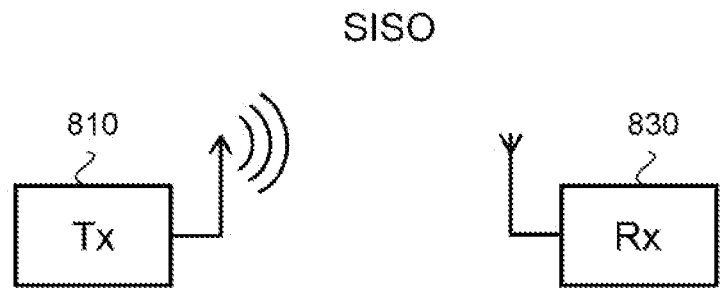
FIG. 4A illustrates a block diagram of a single-input single-output (SISO) wireless network in accordance with an example.
Figure 4B:
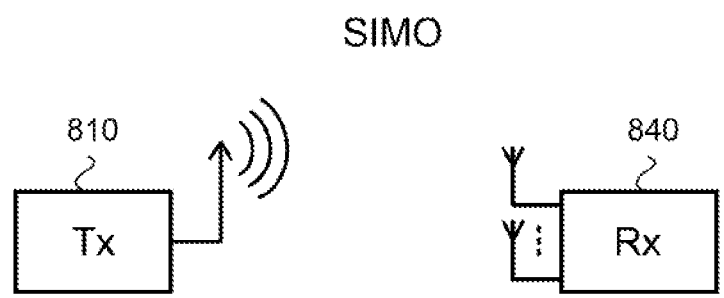
FIG. 4B illustrates a block diagram of a single-input multiple-output (SIMO) wireless network in accordance with an example.
Figure 4C:
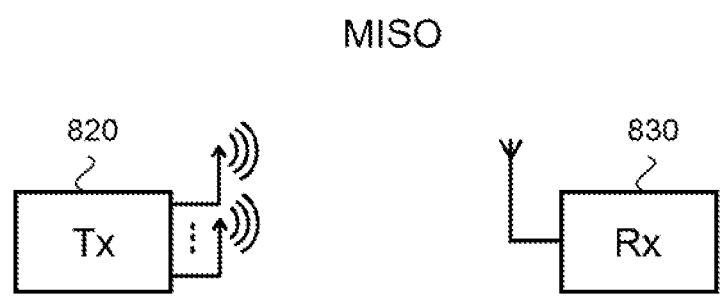
FIG. 4C illustrates a block diagram of a multiple-input single-output (MISO) wireless network in accordance with an example.
Figure 4D:
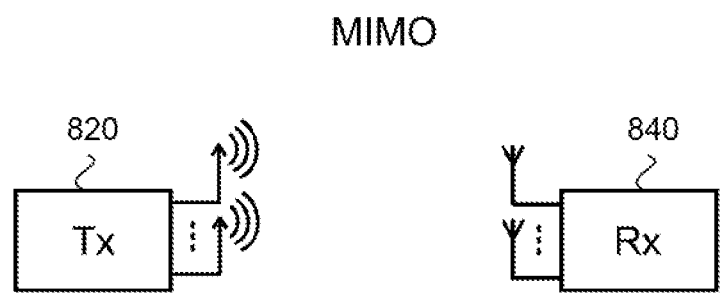
FIG. 4D illustrates a block diagram of a multiple-input multiple-output (MIMO) wireless network in accordance with an example.

FIG. 4A illustrates a wireless communication system using a single radio channel on a transmitting antenna port 810 and a single radio channel on receiving antenna port 830, which can be called a single-input single-output (SISO) wireless network. FIG. 4B illustrates a wireless communication system using a single radio channel 810 on a transmitting antenna port and multiple radio channels on a number of receiving antenna ports 840, which can be called a single-input multiple-output (SIMO) wireless network. FIG. 4C illustrates a wireless communication system using multiple radio channels on a number of transmitting antenna ports 820 and a single radio channel on a receiving antenna port 830, which can be called a multiple-input single-output (MISO) wireless network. FIG. 4D illustrates a wireless communication system using multiple radio channels on a number of transmitting antenna ports 820 and multiple radio channels on a number of receiving antenna ports 840, which can be called a multiple-input multiple-output (MIMO) wireless network. The terms input and output typically refers to the radio channel carrying the signal, and not to the devices having antennas.

A MIMO wireless network can be used for beamforming. Beamforming or spatial filtering is a signal processing technique used in antenna arrays for directional signal transmission or reception. Beamforming can be achieved by combining elements in a phased array in such a way that signals at particular angles experience constructive interference while others experience destructive interference. Beamforming can be used at both the transmitting and receiving ends in order to achieve spatial selectivity.

Cellular data demand continues to experience an increasing growth rate. Combined with the scarcity of available bandwidth, wireless and cellular systems can use MIMO to deliver drastically increased spectral efficiencies to address the capacity demand. Single-user (SU) and multi-user (MU) MIMO systems are integral parts of 3GPP Long Term Evolution (LTE) specifications with antenna dimensions of up to eight antennas in a base-station (e.g., eNodeB). However, an order of magnitude increase in the number of transmit antennas, known as massive MIMO or full-dimension MIMO, can result in significantly higher spectral efficiency.

In a multi-user MIMO (MU-MIMO) system, the aggregate users' rates (e.g., sum-rate capacity or the capacity rate of all the actives users) can increase linearly with the number of transmit (Tx) antennas, assuming channel state information (CSI) is available at the transmitter. The reliability and precision of the CSI can limit the achievable capacity gains. For example, in the frequency-division duplex (FDD) mode of an LTE system, the user equipment (UE) can send CSI back to the eNodeB to inform the eNodeB of different measures of the channel quality. The UE can compute CSI from the reference signals (RS) embedded in the transmitted physical resource blocks (PRB). Channel measurements and feedback can be provided over up to eight antenna ports for various standards, such as LTE-Advanced frequency-division duplex (FDD) specifications. To realize large gains provided by massive MIMO systems, the size of overhead and CSI signaling can be minimized as well as controlling precision requirements of the CSI feedback. Otherwise, linear scaling of pilots (e.g., RS) and feedback with the number of antennas can become prohibitive, which can limit the gains from massive MIMO systems.

Using typically MIMO approaches (e.g., MIMO with transmit antennas up to eight antennas) can generate massive pilots and massive CSI requirements. As disclosed herein, a massive MIMO technology can resolve issues of massive pilots and massive CSI requirements. As a result, a massive MIMO system with reduced pilots and reduced CSI requirements can preserve linear scaling of a sum rate with a large number of transmit antennas (e.g., greater than 8 transmit antennas). Another challenge in MU-MIMO is fairness in serving different users, so none of the UEs wait indefinitely to receive service regardless of the UE's channel conditions (e.g., UEs with poor SINRs may not be starved).

Massive MIMO can be applied to FDD or TDD. In time-division duplex (TDD) massive MIMO, CSI at the transmitter can be obtained from uplink channel measurements through channel reciprocity. Since the same channel is not used for uplink and downlink in FDD, limited overhead signaling and CSI feedback can be used for increasing sum-rate capacity for massive MU-MIMO beamforming, such as used in 3GPP LTE systems.

Principles of random beam-forming (RBF) can be applied for a large antenna array MU-MIMO system. RBF can provide linear scaling of MU-MIMO sum-rate capacity relative to a number of transmit antennas (e.g., transmit antenna size) without full channel knowledge at the transmitter. Limited and partial channel information can be used at the transmitter and still provide an increased sum-rate capacity. Using features of RBF, pilot overhead and feedback requirements of a massive MIMO system can be reduced.

Figure 5:
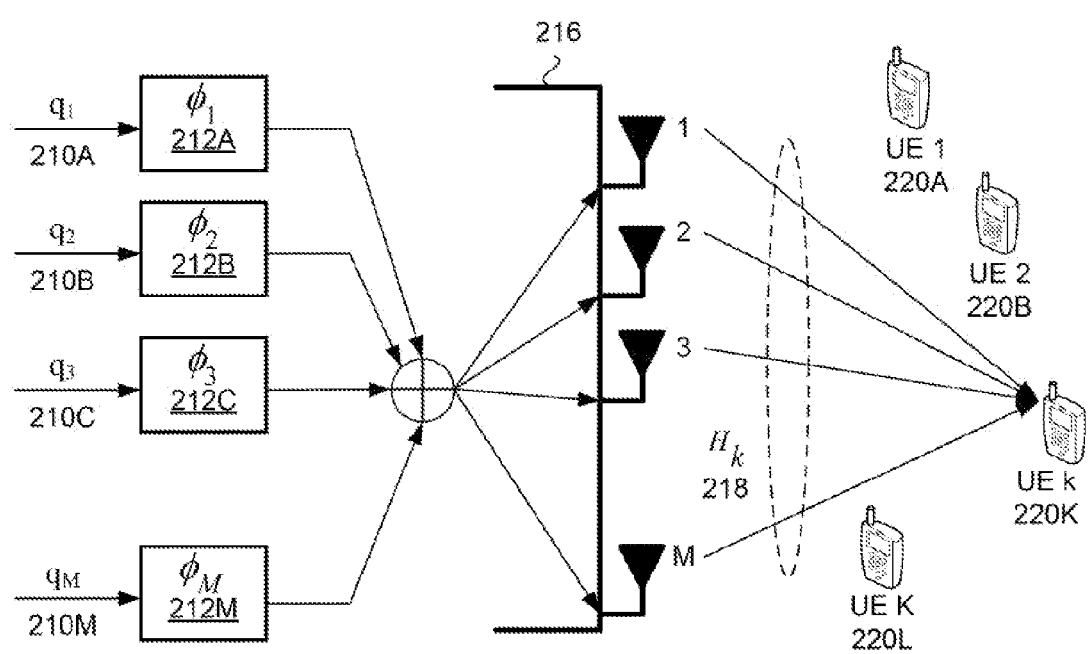
FIG. 5 illustrates a diagram of random beamforming (RBF) to K user equipments (UEs) in accordance with an example.

For example, FIG. 5 illustrates M transmit antenna elements 216 at an LTE eNodeB with K active UEs 220A-B, 220K, and 220L in an eNodeB coverage area. At eNodeB, $m_t$ symbols $q_m$, m=1, . . . , $m_t$ 210A-C and 210M can be precoded with a precoder by $m_t$ orthonormal basis functions $\{\phi_m\}$ 212A-C and 212M. In general, $m_t$ can be less than or equal to M, but for illustration purposes $m_t$=M is assumed. Each $\phi_m$ can be an (Mx1) vector, which can rotate symbol $q_m$ in a specific direction. In an example, symbol $q_m$ can be a complex-valued modulation symbol from a mapper.

At the k-th UE with a channel vector $H_k$: (1×M) 218, the received signal can be corrupted by white complex Gaussian noise $V_k$, so the received signal can be represented by Expression 1 for k=1 . . . , K, where t is a symbol index and n is a subcarrier index. For notation simplicity, reference to t and n is drop herein.

$$x_k(t, n) = \sum_{m=1}^{M} H_k(t, n)\phi_m(t, n)q_m(t, n) + v_k(t, n)$$ [Expression 1]

Figure 6:
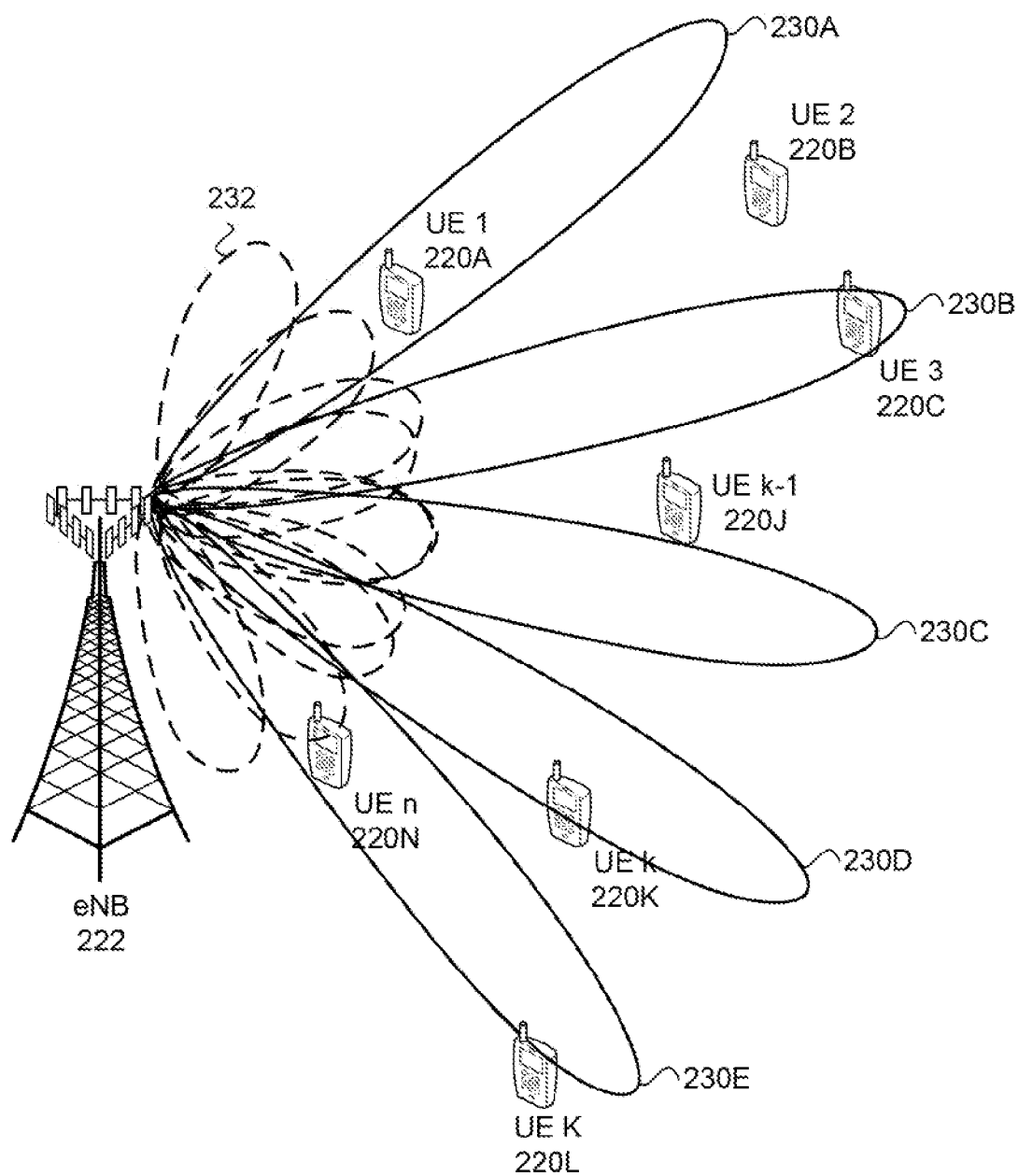
FIG. 6 illustrates a diagram of M narrow beams toward K active user equipments (UEs) in accordance with an example.

As illustrated in FIG. 6, the transmit beamforming from the eNB 222 can attempt to create M narrow beams 230A-E aligned with channel directions of active users 220A-C, 220J-L, and 220N. As part of beamforming, side-lobes 232 can also be generated. Side lobes can be lobes (e.g., local maxima) of a far field radiation pattern that are not the main lobe (i.e., the main beam from beamforming). The specific set of orthonormal functions can be known to the UEs through certain signaling mechanism from the eNodeB, such radio resource control (RRC) signaling. Without the prior knowledge of CSI for each UE, the eNodeB and the UEs can perform beam generation and selection to identify a best beam (with an improved signal-to-interference-plus-noise ratio (SINR)) for a given user k 220K.

Figure 7:
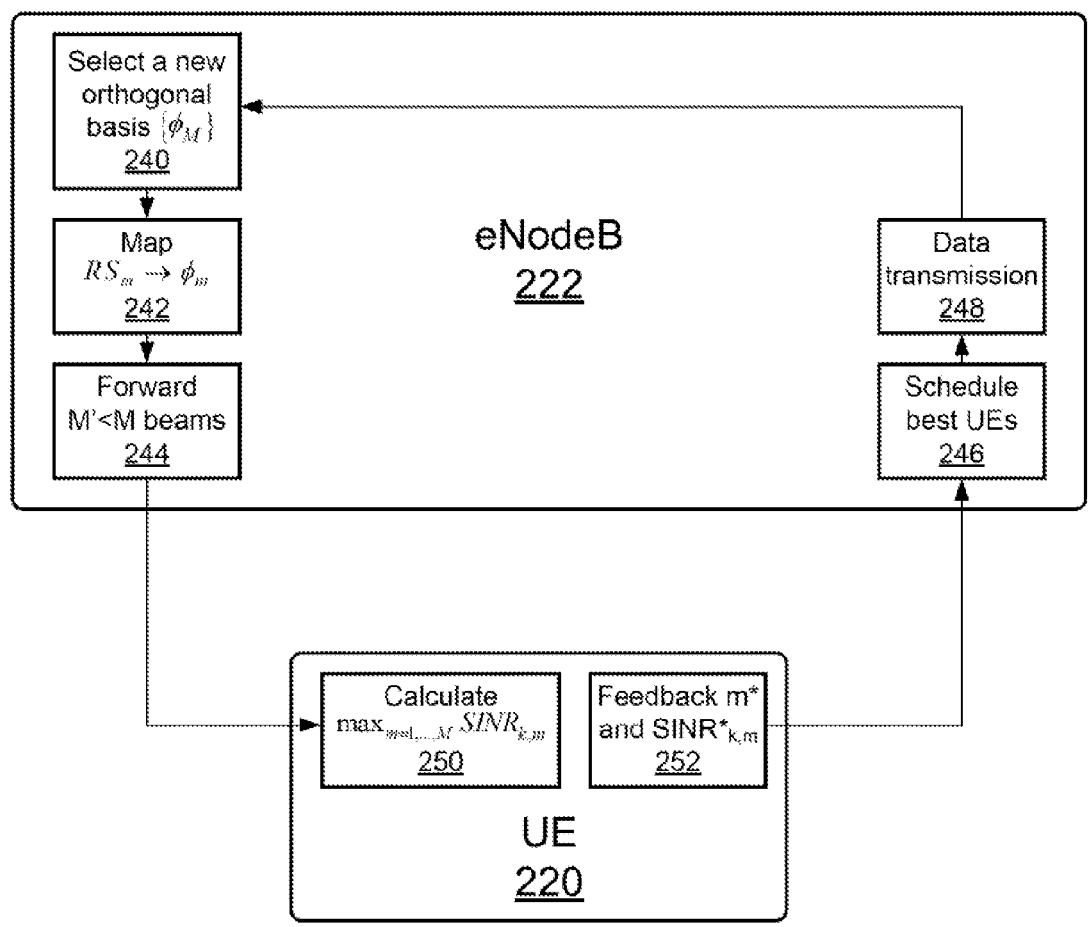
FIG. 7 illustrates a diagram of a beam selection sequence of operations in accordance with an example.

FIG. 7 illustrates an example of beam selection and downlink data transmission. In a beam generation and selection phase example, the node (e.g., eNodeB 222) can generate M new orthogonal M-vectors, $\phi_m$: m=1, . . . , M, or in other words, the node can select a new orthogonal basis $\{\phi_m\}$ 240. The node can generate M orthogonal pilot or reference symbols (RS), $RS_m$: m=1, . . . , M. Then, the node can map the reference symbols to beams, $RS_i \rightarrow \phi_i$ for each integer i, or in other words map $RS_m \rightarrow \phi_m$ 242. In an example, the node can forward (e.g, transmit) M beams or forward M'<M beams 244 (where the number of M' beam is less than M transmit antennas).

At each UE 220, with the knowledge of both $\phi_m$ and $RS_m$: m=1, . . . , M, the UE can assume $RS_m$ is the desired symbol, then calculate a signal-to-interference-plus-noise ratio represented by Expression 2 where $SNR_p$ is the signal-to-noise ratio of the received pilots from the eNodeB.

$$SINR_{k,m} = \frac{|H_k \phi_m|^2}{\frac{1}{SNR_p} + \sum_{i \neq m} |H_k \phi_i|^2}$$ [Expression 2]

With a set of m SINRs at each UE k, UE k can compute or calculate $\max_{m=1, \ldots, M} SINR_{k,m}$ 250 and forward (e.g, feedback) the UE's quantized value to eNodeB and the $\max_{m=1, \ldots, M} SINR_{k,m}$'s related index m 252. The quantized value can be transmitted in a CQI. For example, the $\max_{m=1, \ldots, M} SINR_{k,m}$'s related index in can be represented by m* and the $\max_{m=1, \ldots, M} SINR_{k,m}$ can be presented as $SINR^*_{k,m}$.

Quantization is the process of mapping a large set of input values to a smaller set, such as rounding values to some unit of precision. A device or algorithmic function that performs quantization is called a quantizer. The round-off error introduced by quantization is referred to as quantization error. For example, an optimal beam may be quantized to a discrete index of the optimal beam, such as a precoding matrix indicator (PMI). In another example, a signal-to-interference-plus-noise ratio (SINR) for an optimal beam may be quantized to a discrete SINR value, such as a channel quality indicator (CQI).

The PMI can be a signal fed back by the UE to support a multiple-input multiple-output (MIMO) operation. The PMI can correspond to an index of the precoder (within a codebook shared by the UE and eNodeB), which can maximize an aggregate number of data bits which can be received across all downlink spatial transmission layers. The CQI can be signaled by a UE to the eNodeB to indicate a suitable data rate, such as a modulation and coding scheme (MCS) value, for downlink transmissions, which can be based on a measurement of the received downlink signal to interference plus noise ratio (SINR) and knowledge of the UE's receiver characteristics. A signal-to-noise-and-interference ratio (SINR) or signal-to-interference ratio (S/I or SIR), also known as the carrier-to-interference ratio (C/I, CIR), refers to the quotient between the average received modulated carrier power S or C and the average received co-channel interference power I (i.e., cross-talk, from other transmitters than the useful signal).

After the node receives the feedback from the UEs 220, the node can order the received $\max_{m=1, \ldots, M} SINR_{k,m}$ relative to each other for the plurality of beams.

Figure 8:
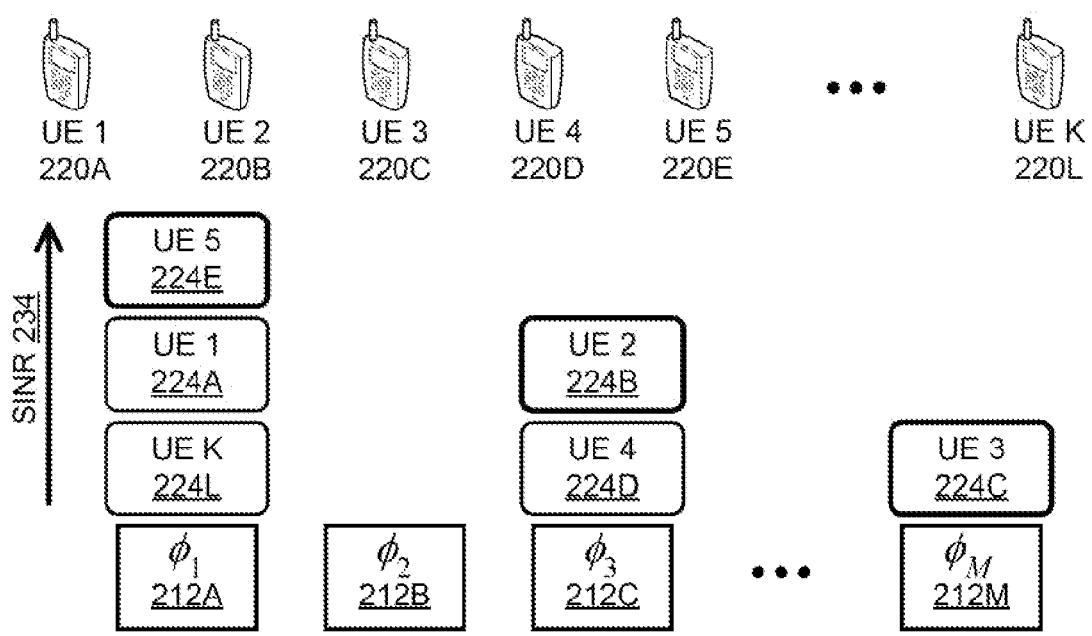
FIG. 8 illustrates a diagram of a scheduling priority among the K user equipments (UEs) due to random beamforming (RBF) in accordance with an example.

In a downlink (DL) data transmission phase, to maximize sum-rate, the eNodeB can allocate DL capacity to UEs with a best SINR for the UEs with a same best beam index m, or apply simple random selection. FIG. 8 illustrates a scheduling priority among the K user equipments (UEs) 220A-E and 220L due to random beamforming (RBF). UE 5 224E, UE1 224A, and UE K 224L can have a maximum SINR for beam direction $\phi_1$ 212A in a set $\{\phi_m\}$, where UE 5 has a higher maximum SINR 234 than UE 1 and UE K. Likewise, UE 2 224B can have a higher maximum SINR than UE4 224D for beam direction $\phi_3$ 212C, and UE 3 224C can have a maximum SINR for beam direction $\phi_M$ 212M. No UE may report a maximum SINR for beam direction $\phi_2$ 212B. The eNodeB can schedule data transmission for UE 5 with beam direction $\phi_1$, UE 2 with beam direction $\phi_3$, and UE 3 with beam direction $\phi_M$.

Referring back to FIG. 7, the eNodeB can schedule the best UEs 246 for data transmission 248. Then, the eNodeB can resume training for a next time interval by switching to a new $\{\phi'_m\}$ set, where at least one beam in the new $\{\phi'_m\}$ set has a different beam direction than beams the $\{\phi_m\}$ set.

Figure 9:
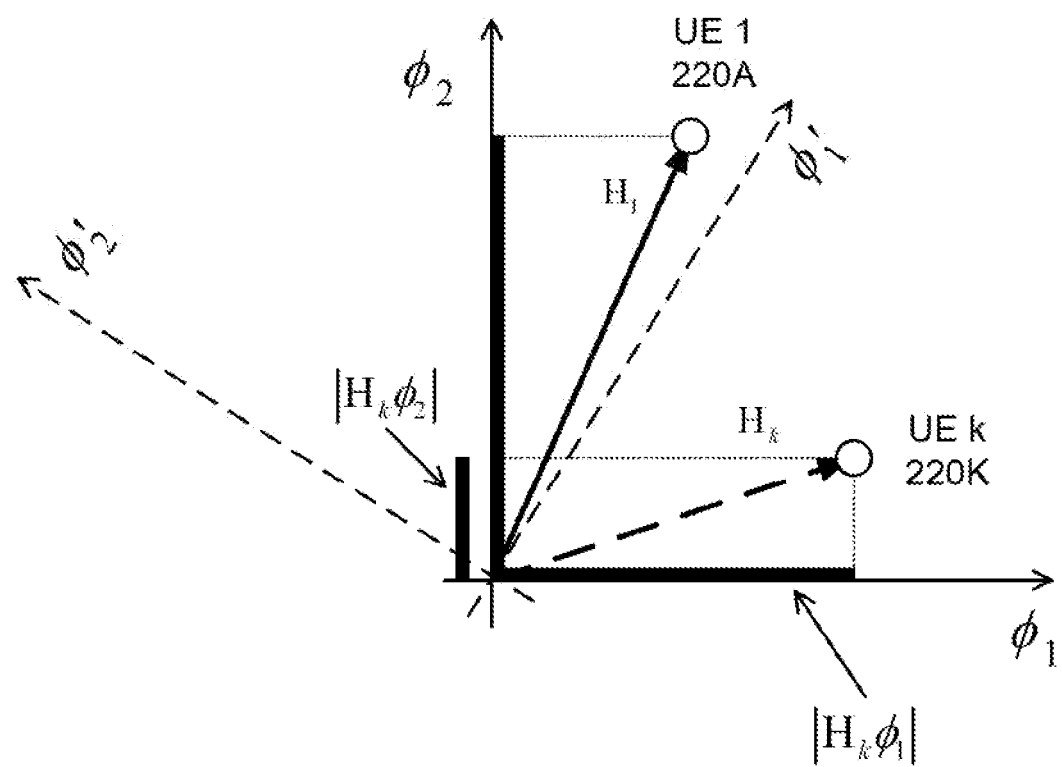
FIG. 9 illustrates a diagram of signal and interference components for a two transmitter (2-Tx) antenna in accordance with an example.

For illustration purposes, FIG. 9 displays how a best beam for user k 220K is identified for a case of a 2-antenna transmission. The projection of user k channel onto the two-basis functions can determine the signal and interference components for a given beam direction (e.g., $\phi_1$ or $\phi_2$). In the example of FIG. 9, $|H_k\phi_1|$ relates to a power of a desired signal assuming $\phi_1$ is used for a transmission to UE k, and thus $|H_k\phi_2|$ can be the interference from beam $\phi_2$ which is being used for UE 1 220A. As shown and visualized in the FIG. 9, a nearest coordinate can result in the best beam direction. In another $\{\phi'_m\}$ set, beam direction $\phi'_1$ can be a nearest coordinate to UE 1 or UE k.

Figure 10:
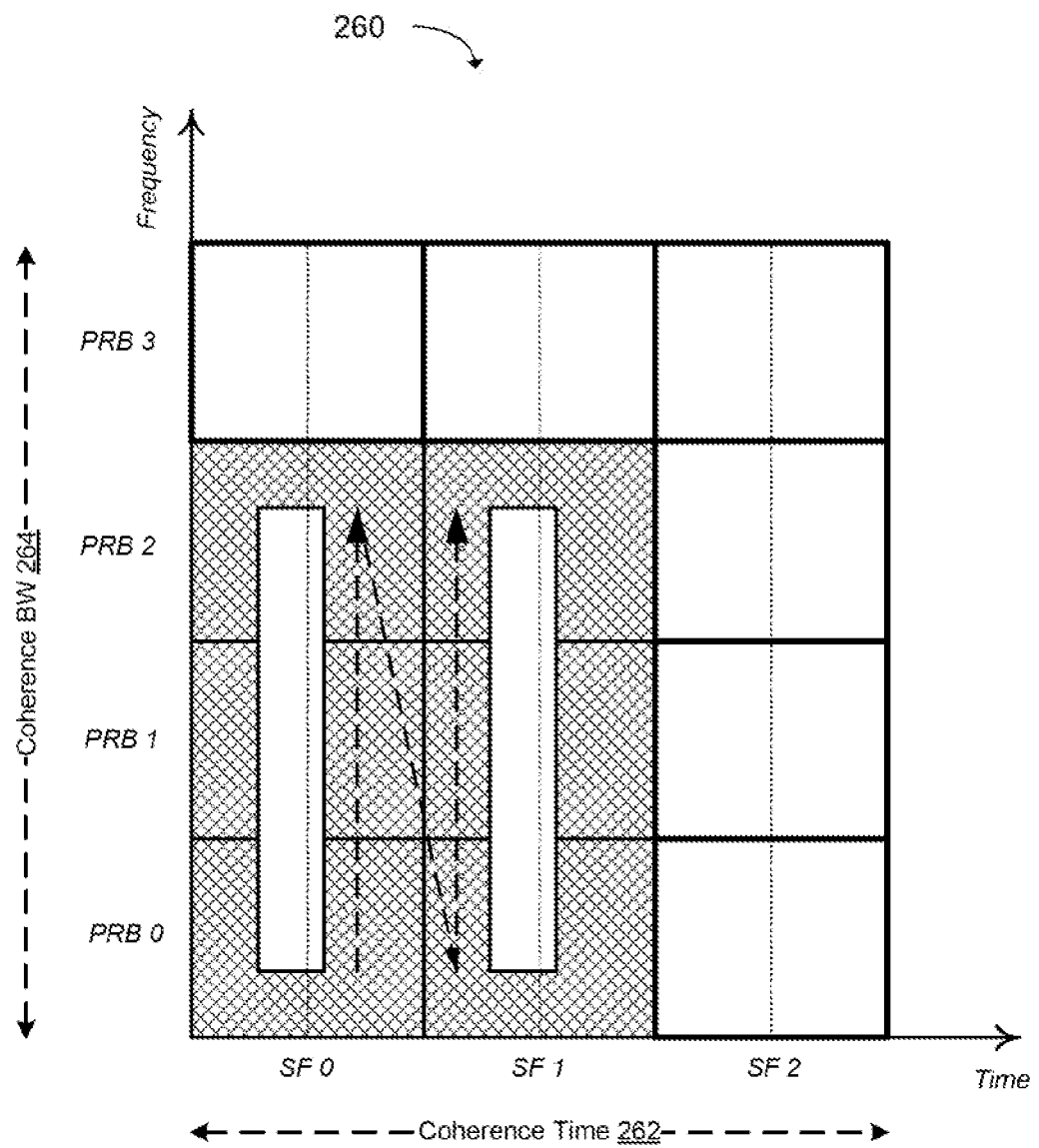
FIG. 10 illustrates a diagram of a beam selection pattern in time and frequency domains in accordance with an example.

In deploying massive node antennas (e.g., LTE), random beamforming can be extended to handle limited overhead and feedback. In an example, the beam selection phase can occur during minimum time and frequency variation, such as a within a time-frequency 'tile' smaller than or equal to a coherence bandwidth (BW) 264 by coherence time 262 product (e.g., coherence bandwidth X coherence time) of the channel, as depicted in FIG. 10. The 'tile' in a resource grid 260 can be represented by two dimensional (2D) region of PRB 0-2 and subframes (SF) 0-1 (e.g., 2 subframes×3 PRBs). In the example, a frequency first mapping of the RS to beams can be used where PRB 0, PRB 1, and then PRB 2 for SF 0 then PRB 0, PRB1, and then PRB 2 for SF 1. An alternative to the training in the 2D domain, can be an optimal one dimensional (1D) beam selection 'vertically' over only frequency PRBs or an optimal 1D beam selection 'horizontally' over time subframes. For the example shown in FIG. 11, beam selection is provided in the 1D frequency domain over successive PRBs, but a similar process can be used for 1D time-domain or 2D time and frequency domains.

Figure 11:
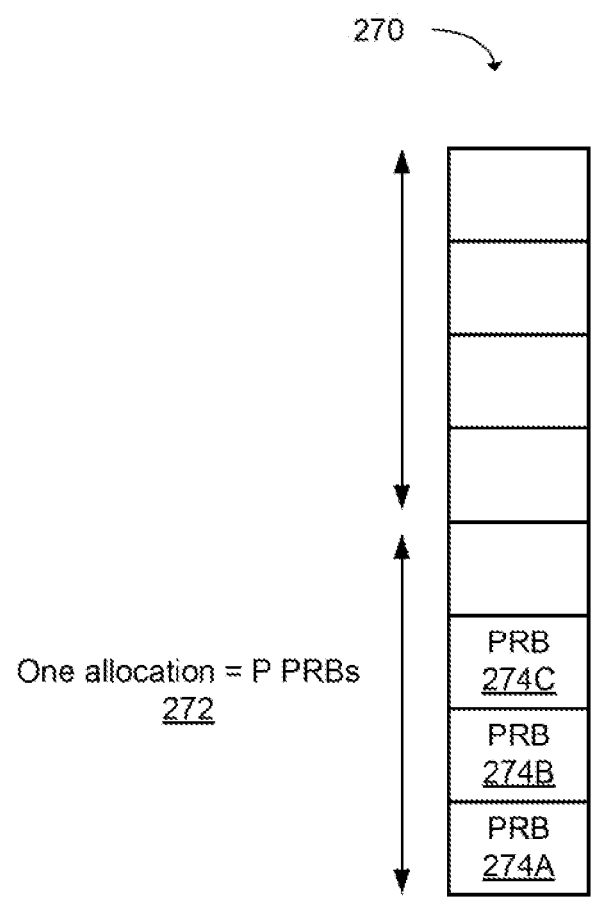
FIG. 11 illustrates a diagram of one allocation including P physical resource blocks (PRBs) in accordance with an example.

FIG. 11 illustrates one allocation including P physical resource blocks (PRBs) 274A-C in a subframe 270 (or slot of a subframe). In an example P PRBs 272 (or PRB pairs) can form one "allocation" in which subcarriers are assigned to multiple UEs. In another example, the size of each scheduling allocation can be a same as a size of one "subband" considered for subband CSI feedback. Therefore, P can be 4, 6, or 8 PRBs, as given in a 3GPP LTE specification. However, generally, "subbands" and "allocations" can have different sizes.

For example, within any PRB pair, up to eight beams can be trained using distinct channel state information reference signals (CSI-RSs) of eight available antenna ports. The CSI-RS can be precoded with $\phi_m$: m=1, ..., M. Typically (e.g., for LTE specification Release 11 and earlier), CSI-RS can be transmitted without precoding. For less favorable channels (e.g., channels with a low SINR), one CSI-RS observation per beam may not result in reliable SINR estimation, therefore using more than one CSI-RS resource for a given beam $\phi_m$ can result in training less than eight beams.

The number of CSI-RS resources available for an allocation relative to the number of beams and poor SINRs for some beams can determine the beam selection process. For example, different beam selection processes can be used when training a total of N<M beams for M transmit antennas, where R CSI-RS resources are available in each PRB with an allocation (e.g., subband) size of S PRB pairs and a total number of A allocations. For instance, an S*R maximum number of beams may be trained in one allocation.

In a subband-based PMI/CQI reporting example, three different beam selection processes can be distinguished, where A=1.

For S*R<N (or for wideband feedback A*S*R<N), each subband S*R beams can be used for both training and subsequent data transmission. The UE can calculate a PMI and a CQI in each subband based on the S*R beams activated within that subband. The UE can calculate a PMI and a CQI in each subband based on the next S*R beams activated within that subband, and continue the process over several subbands until the beam limit of N is exhausted. When all N beams are used, the UE can identify a maximum CQI and an associated PMI and report back the maximum CQI and the PMI to eNodeB. Then the process can repeat or start from the beginning.

For S*R=N (or for wideband feedback A*S*R=N), one PMI and one maximum CQI can be generated per subband and the UE can feedback the CQI and the PMI to eNodeB.

For S*R>N (or for wideband feedback A*S*R>N), some beams can be trained twice, which implies more observations and hence better quality CQI and PMI estimates can be calculated at the UE. For other beams, one PMI (e.g., beam index) and one CQI (e.g., SINR) per subband can be calculated at the UE. Then, the UE can feedback the CQI and the PMI to eNodeB.

A similar procedure can be applied for wideband CQI/PMI, with a total of A*S*R as the number of trained beams for a whole band. Subband feedback, can be considered as a special case of wideband feedback with A=1.

Figure 12:
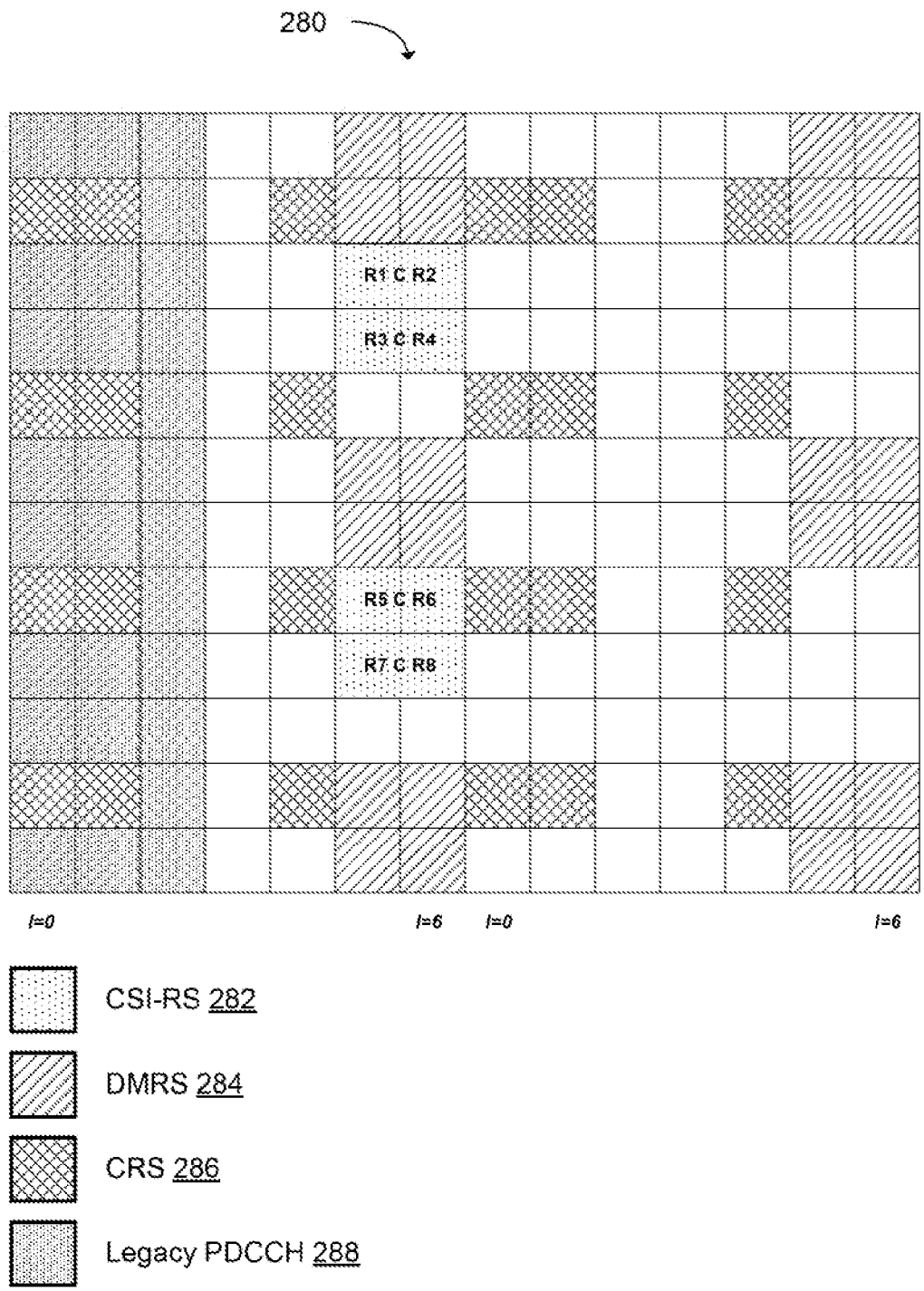
FIG. 12 illustrates a diagram of mapping reference symbols to resource elements (REs) locations for the case of training eight beams simultaneously using eight antenna ports in accordance with an example.

In another example, a UE can be used for SINR calculation. The UE can identify a beam index by relating a RS to a beam using a RS→$\phi$ mapping. The mapping information can be signaled to the UE by the eNodeB before taking effect (e.g., before being used by the UEs). The UE can measure reference signal received power (RSRP) for each four CSI-RS group in a case where eight CSI-RS opportunities in a PRB pair have been assigned different reference signals, as shown in FIG. 12. FIG. 12 illustrates, CSI-RS 282 R1-R8, demodulation reference signal (DMRS) 284, cell-specific reference signals (CRS) 286, and a legacy physical downlink control channel (PDCCH) 288 for a PRB pair 280 where C denotes code division multiplexing (CDM) between two symbols (e.g. groups R1 and R2, R3 and R4, R5 and R6, or R7 and R8). For each group (e.g., m and m+1), the UE can verify if the RSRP is greater than a noise floor. A noise floor can be used to determine when a RSRP is strong enough to provide useful data. When the RSRP for the group (e.g., R1 and R2) exceeds the noise floor, the UE can resolve CDM between the two indices by de-spreading with a length-2 cover. Then, the UE can identify beam indexes m and m+1. The UE can then calculate $|H_k\phi_m|^2$ and $|H_k\phi_{m+1}|^2$.

When the RSRP for the group (e.g., R1 and R2) does not exceed the noise floor, the UE may not identify beam for the CSI-RS group (e.g., the two individual CSI-RS in the CSI-RS group), which can mean the UE is well outside a width of a given beam, implying near-zero contribution to the interference.

When a signal power can be generated for a CSI-RS, the UE can collect the powers $|H_k\phi_m|^2$ for m=1, ..., M after exhausting the beams through the different PRB pairs. Then, the UE can compute $$\max SINR_{k,m} = \frac{|H_k \phi_m|^2}{\frac{1}{SNR_p} + \sum_{i \neq m} |H_k \phi_i|^2}$$

and report the max SINR and a max SINR beam index to the node (e.g. eNodeB).

In a multiple-cell environment during beam selection, a possibility of interference from adjacent cells (or neighboring) due to the impact from identical reference signals can potentially result in misaligned beams. In the multiple-cell environment, interference control on the beam training can include various mechanisms. For example, multiple patterns for CSI-RS can be used for greater than one reuse (e.g., 20, 20, 10, 5 different configurations for 1, 2, 4, 8 antenna ports, respectively). For a $\{\phi_m\}$ re-use greater than one, two options can be used. In a first option, if M basis functions have been used in a given cell, a constant phase shift can be applied to generate a new $\{\phi'_m\}$ set to be used in the neighboring cell. FIG. 5 illustrates the constant phase shift (e.g., $\phi'_1$ and $\phi'_2$). In this way, a local cell can have a different set of functions from neighboring cells. In a second option, a different $RS_i \rightarrow \phi_j$ permutation can be used where i and j are integers. Calculation of the SINR can depend on a specific $RS \rightarrow \phi$ mapping. Numerous permutations for the $RS \rightarrow \phi$ mapping can be used, which can be communicated to the UEs prior to being used.

In another example, a basis rotation (e.g. beam direction phase shift) can be used to improve a resolution or coverage area provided by the beamforming. For example, UEs outside a propagation coverage of potentially narrow beamwidths of large transmission antenna arrays can benefit from basis rotation, such as UE 2 220B as illustrated in FIG. 6. To treat UE 2 fairly, a basis rotation can be applied within a specified duration (e.g., once every several tens of subframes). As a result, a rotation pattern, such as $\{\phi_m\} \rightarrow \{\phi'_m\} \rightarrow \{\phi''_m\} \rightarrow \{\phi_m\}$ can be applied to cover the physical space covered by the cell. FIG. 9 illustrates a $\{\phi_m\} \rightarrow \{\phi'_m\}$ rotation sequence. An exact sequence of basis rotation can be negotiated in advance between the node (e.g., eNodeB) and the UEs in the cell.

Figure 13:
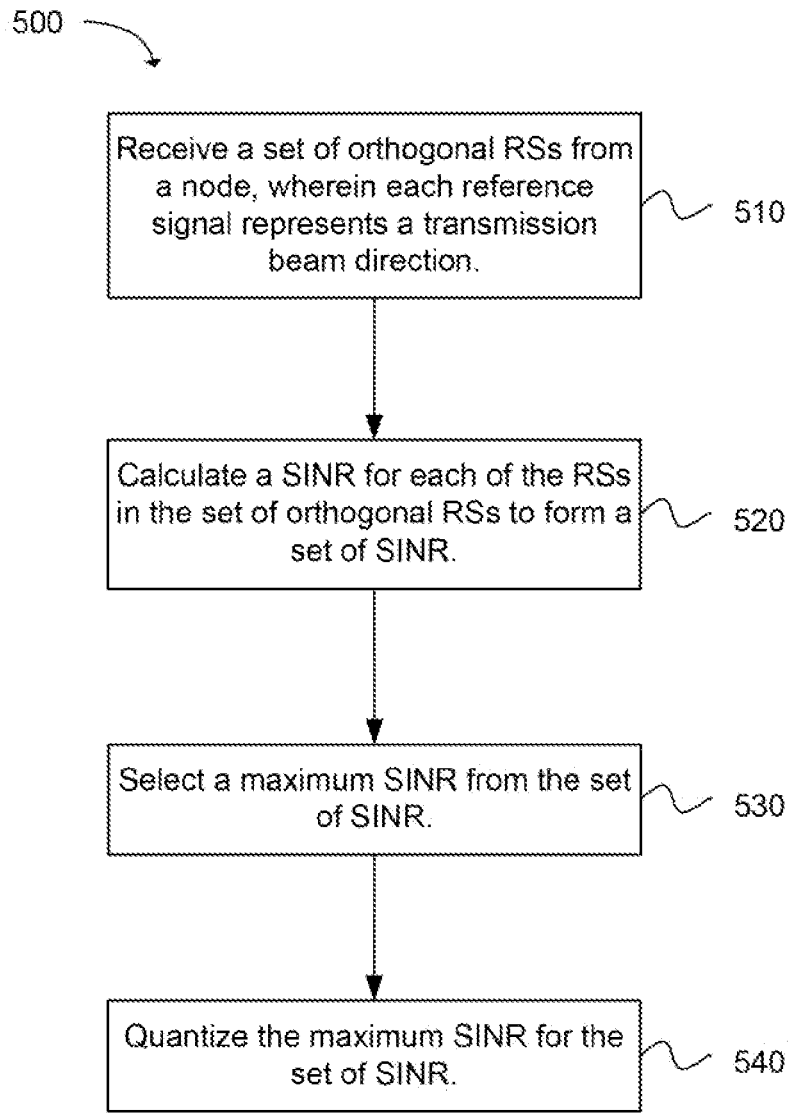
FIG. 13 depicts functionality of computer circuitry of a user equipment (UE) operable to generate an improved signal-to-interference-plus-noise ratio (SINR) from a set of orthogonal reference signals (RSs) in accordance with an example.

Another example provides functionality 500 of computer circuitry of a processor and/or transceiver on a user equipment (UE) operable to generate an improved signal-to-interference-plus-noise ratio (SINR) from a set of orthogonal reference signals (RSs), as shown in the flow chart in FIG. 13. The functionality may be implemented as a method or the functionality may be executed as instructions on a machine, where the instructions are included on at least one computer readable medium or one non-transitory machine readable storage medium. The computer circuitry can be configured to receive a set of orthogonal RSs from a node, wherein each reference signal represents a transmission beam direction, as in block 510. The computer circuitry can be further configured to calculate a SINR for each of the RSs in the set of orthogonal RSs to form a set of SINR, as in block 520. The computer circuitry can also be configured to select a maximum SINR from the set of SINR, as in block 530. The computer circuitry can be further configured to quantize the maximum SINR for the set of SINR, as in block 540.

In an example, the computer circuitry can be further configured to transmit the quantized maximum SINR and a reference signal index for the quantized maximum SINR to the node. The SINR can be represented by $$SINR_{k,m} = \frac{|H_k \phi_m|^2}{\frac{1}{SNR_p} + \sum_{i \neq m} |H_k \phi_i|^2},$$

the maximum SINR can be represented by $\max_{m=1,\ldots,M} SINR_{k,m}$, the quantized maximum SINR can be transmitted in a channel quality indicator (CQI), and the reference signal index is represented by m, where $|H_k \phi_m|^2$ represents a received signal power for a RS with the reference signal index nm. $\Sigma_{i \neq m} |H_k \phi_i|^2$ represents a received signal power for the other RSs in the set of orthogonal RSs, the $SNR_p$ is the a signal-to-noise ratio (SNR) of received RSs in the set of orthogonal RSs, $H_k$ is an estimated channel vector of the received RSs for the UE k, M is a number of transmit antennas by the node and m=1, 2, . . . , M, $\phi_m$ is a m-th precoding vector in an orthogonal set, and $\phi_i$ is an i-th precoding vector in the orthogonal set.

In another example, for A*S*R>N, where the RSs are channel state information RSs (CSI-RSs), R is the CSI-RS available in each physical resource block (PRB), S is the number of PRBs in an allocation, A is the number of allocations for a transmission, and N is a total number of beam transmissions for M transmit antennas at the node: the computer circuitry configured to receive the set of orthogonal RSs; calculate a SINR for each of the RS; select a maximum SINR; quantize the maximum SINR; and transmit the quantized maximum SINR and the reference signal index, can be further configured to: Recursively receive the set of orthogonal RSs for each allocation, where the set of orthogonal RSs is mapped to S*R transmission beams, and A allocations are received; calculate a precoding matrix indicator (PMI) and a channel quality indicator (CQI) for the maximum SINR in each allocation based on the S*R transmission beam activated in the allocation, select a maximum PMI and a maximum CQI from the A allocations; and transmit the maximum PMI and the maximum CQI to the node.

In another configuration, for A*S*R=N, where the RSs are channel state information RSs (CSI-RSs), R is the CSI-RS available in each physical resource block (PRB), S is the number of PRBs in an allocation, A is the number of allocations for a transmission, and N is a total number of beam transmissions for M transmit antennas at the node: the computer circuitry configured to receive the set of orthogonal RSs; calculate a SINR for each of the RS; select a maximum SINR; quantize the maximum SINR: and transmit the quantized maximum SINR and the reference signal index, can be further configured to: Receive the set of orthogonal RSs for an allocation, wherein the set of orthogonal RSs is mapped to A*S*R transmission beams; calculate a maximum precoding matrix indicator (PMI) and a maximum channel quality indicator (CQI) for the maximum SINR in the allocation based on the A*S*R transmission beam activated in the allocation: and transmit the maximum PMI and the maximum CQI to the node.

In another example, for A*S*R>N, where the RSs are channel state information RSs (CSI-RSs), R is the CSI-RS available in each physical resource block (PRB), S is the number of PRBs in an allocation, A is the number of allocations for a transmission, and N is a total number of beam transmissions for M transmit antennas at the node; the computer circuitry configured to receive the set of orthogonal RSs: calculate a SINR for each of the RS; select a maximum SINR; quantize the maximum SINR: and transmit the quantized maximum SINR and the reference signal index, can be further configured to: Receive the set of orthogonal RSs for an allocation, where the set of orthogonal RSs is mapped to A*S*R transmission beam directions, and at least two RSs in the set of orthogonal RSs are mapped to one of the transmission beams; calculate a maximum precoding matrix indicator (PMI) and a maximum channel quality indicator (CQI) for the maximum SINR in the allocation based on the A*S*R transmission beam activated in the allocation, where one of the SINRs is calculated from the at least two RSs; and transmit the maximum PMI and the maximum CQI to the node.

In another configuration, the computer circuitry can be further configured to: Receive a second set of orthogonal RSs from the node, where each reference signal represents a transmission beam direction, the second set of orthogonal RSs differs from the set of orthogonal RSs, and at least one transmission beam direction represented in the second set of orthogonal RSs is not in the set of orthogonal RSs; calculate the SINR for each of the RSs in the second set of orthogonal RSs to form a second set of SINR; select a maximum SINR from the second set of SINR; and quantize the maximum SINR for the second set.

In another example, the computer circuitry configured to receive the set of orthogonal RSs from the node can be further configured to multiple-input and multiple-output (MIMO) decode a demodulated RS that is precoded by the node. In another configuration, the computer circuitry can be further configured to identify each beam index for the RS by a RS to beam mapping.

In another example, the computer circuitry configured to calculate a SINR for each of the RS can be further configured to, for more than four beams in each physical resource block (PRB) pair, where the RSs are channel state information RSs (CSI-RSs): Measure reference signal received power (RSRP) for each CSI-RS group including CSI-RSs for more than four beams: de-spread with a length-2 cover to resolve code division multiplexing (CDM) between two beam indices when RSRP is greater than a floor noise threshold; identify two beam indexes for at least one of the CSI-RS groups; and calculate power for both beams represented by the indexes two beam indexes.

Figure 14:
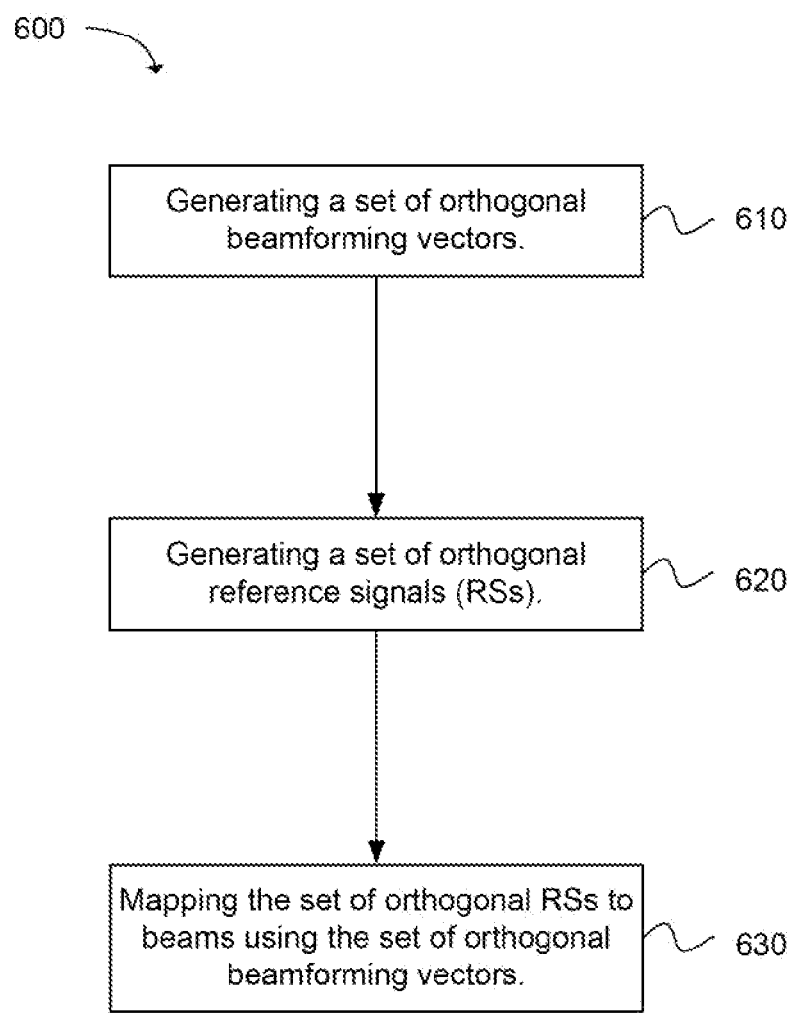
FIG. 14 depicts a flow chart of a method for providing beam selection using orthogonal beamforming vectors at a node in accordance with an example.

Another example provides a method 600 for providing beam selection using orthogonal beamforming vectors at a node, as shown in the flow chart in FIG. 14. The method may be executed as instructions on a machine, computer circuitry, or a processor for the node (e.g., eNB), where the instructions are included on at least one computer readable medium or one non-transitory machine readable storage medium. The method includes the operation of generating a set of orthogonal beamforming vectors, as in block 610. The operation of generating a set of orthogonal reference signals (RSs) follows, as in block 620. The next operation of the method can be mapping the set of orthogonal RSs to beams using the set of orthogonal beamforming vectors, as in block 630.

In an example, the operation of mapping the set of orthogonal RSs to beams can further include precoding a set of modulation symbols by orthogonal basis functions. The orthogonal basis functions can use the orthogonal beamforming vectors, each orthogonal basis function can rotate the modulation symbols in a specific direction, and the set of orthogonal RSs can be channel state information RSs (CSI-RSs). The method can further include transmitting the orthogonal RSs in a beam to a user equipment (UE).

In another configuration, the method can further include: Receiving a quantized maximum signal-to-interference-plus-noise ratio (SINR) from each of a plurality of user equipments (UEs) and a reference signal (RS) index for each quantized maximum SINR; scheduling downlink resources for each beam using a UE with a highest quantized maximum SINR relative to other UEs; and transmitting data using a beam to the UE with the highest quantized maximum SINR for the beam relative to the other UEs. The RS index can represent a beam for each UE with a best SINR for the set of orthogonal RSs, the quantized maximum SINR can be received in a channel quality indicator (CQI) for each UE, and the RS index can be determined by a precoding matrix indicator (PMI) received from each UE. The SINR can be represented by $$SINR_{k,m} = \frac{|H_k \phi_m|^2}{\frac{1}{SNR_p} + \sum_{i \neq m} |H_k \phi_i|^2},$$

the maximum SINR can be represented by $\max_{m=1, \ldots, M} SINR_{k,m}$, the quantized maximum SINR can be received in a channel quality indicator (CQI), and the reference signal index is represented by m, where $|H_k \phi_m|^2$ represents a received signal power at a UE for a RS with the reference signal index m, $\Sigma_{i \neq m}|H_k \phi_i|^2$ represents a received signal power at the UE for the other RSs in the set of orthogonal RSs, the $SNR_p$ is a signal-to-noise ratio (SNR) of received RSs in the set of orthogonal RSs, $H_k$ is an channel vector of the received RSs for the UE k, M is a number of transmit antennas by the node and m=1, 2, . . . , M, $\phi_m$ is a m-th precoding vector in an orthogonal set, and $\phi_i$ is an i-th precoding vector in the orthogonal set.

In another example, the method can further include: Recursively generating another set of orthogonal beamforming vectors, where the other set of orthogonal beamforming vectors differs from a first set of orthogonal beamforming vectors; generating another set of orthogonal reference signals (RSs); and mapping the other set of orthogonal RSs to other beams using the other set of orthogonal beamforming vectors, where the other beams differ in direction from first beams generated.

Figure 15:
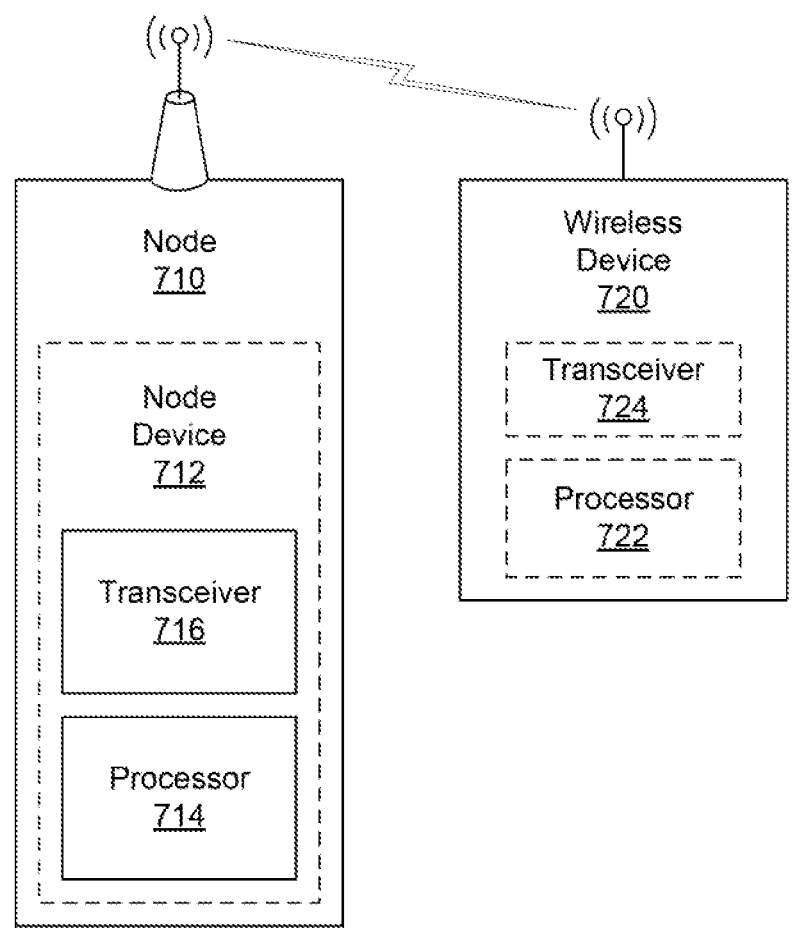
FIG. 15 illustrates a block diagram of a node (e.g., eNB) and wireless device (e.g., UE) in accordance with an example.

FIG. 15 illustrates an example node 710 (e.g. eNB) and an example wireless device 720 (e.g., UE). The node can include a node device 712. The node device or the node can be configured to communicate with the wireless device (e.g., UE). The node device can include a processor 714 and a transceiver 716. The processor 714 and/or transceiver 716 can be configured for providing beam selection using orthogonal beamforming vectors, as described in 600 of FIG. 14. In another example, the processor 714 and/or transceiver 716 can be configured for random beamforming (RBF). In an example, the node can include M transmit antennas, where M>8 (i.e., number of transmit antennas is greater than eight antennas). The node can include a base station (BS), a Node B (NB), an evolved Node B (eNB), a baseband unit (BBU), a remote radio head (RRH), a remote radio equipment (RRE), a remote radio unit (RRU), or a central processing module (CPM).

Referring back to FIG. 15, the transceiver 716 can be configured to receive, from each of a plurality of user equipments (UEs), a quantized maximum signal-to-interference-plus-noise ratio (SINR) and a pilot index for each quantized maximum SINR. The pilot index can represent a beam for each UE with a best SINR for a set of orthogonal pilots, the quantized maximum SINR can be transmitted in a channel quality indicator (CQI), and the pilot index can be determined by a transmitted precoding matrix indicator (PMI). The processor 714 can be configured to schedule a downlink transmission for each beam using UEs with a highest quantized maximum SINR relative to other UEs. The transceiver can be further configured to transmit data via a set of transmit antennas using a beam to the UEs with the highest quantized maximum SINR for the beam relative to other UEs.

In another example, the SINR is represented by $$SINR_{k,m} = \frac{|H_k \phi_m|^2}{\frac{1}{SNR_p} + \sum_{i \neq m} |H_k \phi_i|^2},$$

the maximum SINR is represented by $\max_{m=1, \ldots, M} SINR_{k,m}$, the quantized maximum SINR is received in a channel quality indicator (CQI), and the reference signal index is represented by m, where $|H_k \phi_m|^2$ represents a received signal power at a UE for a RS with the reference signal index m, $\Sigma_{i \neq m} |H_k \phi_i|^2$ represents a received signal power at the UE for the other RSs in the set of orthogonal RSs, the $SNR_p$ is the a signal-to-noise ratio (SNR) of received RSs in the set of orthogonal RSs, $H_k$ is an channel vector of the received RSs for the UE k, M is a number of transmit antennas by the node and m=1, 2, ..., M, $\phi_m$ is a m-th precoding vector in an orthogonal set, and $\phi_i$ is an i-th precoding vector in the orthogonal set.

In another configuration, the processor 714 can be further configured to select an allocation for pilots used to generate an N total number of beams via M transmit antennas. The allocation can be within a coherence time and a coherence bandwidth, the coherence time, or the coherence bandwidth. The coherence time is a time duration or number of subframes over which a channel impulse response varies less than a coherence time threshold, and coherence bandwidth is a range of frequencies or physical resource blocks (PRBs) over which the channel impulse response varies less than a coherence bandwidth threshold. The coherence time threshold and the coherence bandwidth threshold may be set by measuring SINR of PRBs or subframes for a system.

In another example, for A*S*R<N, where the orthogonal pilots are channel state information RSs (CSI-RSs), R is the CSI-RS available in each PRB, S is the number of PRBs in an allocation, A is the number of allocations for a transmission, and N is the total number of beam transmissions for the M transmit antennas, the processor 714 can be further configured to: Recursively generate a set of $m_t$ orthogonal vectors for A number of allocations, where $m_t \leq M$ for each allocation; recursively generate the set of orthogonal CSI-RSs for each allocation, and map each set of orthogonal CSI-RSs to S*R transmission beams using the set of orthogonal vectors for the A number of allocations. The transceiver 716 can be further configured to transmit each set of orthogonal CSI-RSs to the S*R transmission beams for the A number of allocations. The quantized maximum SINR and the pilot index can be for the N total number of beam transmissions.

In another configuration, for A*S*R=N, where the orthogonal pilots are channel state information RSs (CSI-RSs). R is the CSI-RS available in each PRB, S is the number of PRBs in an allocation, A is the number of allocations for a transmission, and N is the total number of beam transmissions for the M transmit antennas, the processor 714 can be further configured to: Generate a set of m orthogonal vectors for an allocation, wherein $m_t \leq M$ for the allocation; generate the set of orthogonal CSI-RSs for the allocation; and map the set of orthogonal CSI-RSs to A*S*R transmission beams using the set of orthogonal vectors for the allocation. The transceiver 716 can be further configured to transmit each set of orthogonal CSI-RSs to the A*S*R transmission beams for the allocation. The quantized maximum SINR and the pilot index can be for the A*S*R number of beam transmissions.

In another example, wherein for A*S*R>N, where the orthogonal pilots are channel state information RSs (CSI-RSs), R is the CSI-RS available in each PRB, S is the number of PRBs in an allocation, A is the number of allocations for a transmission, and N is the total number of beam transmissions for the M transmit antennas, the processor 714 can be further configured to: Generate a set of $m_t$ orthogonal vectors for an allocation, wherein $m_t \leq M$ for the allocation; generate the set of orthogonal CSI-RSs for the allocation; and map the set of orthogonal CSI-RSs to A*S*R transmission beams using the set of orthogonal vectors for the allocation. At least two CSI-RSs in the set of orthogonal RSs can be mapped to one of the transmission beams. The transceiver 716 can be further configured to transmit each set of orthogonal CSI-RSs to the A*S*R transmission beams for the allocation. The quantized maximum SINR and the pilot index can be for the A*S*R number of beam transmissions.

In another configuration, the allocation can be a subband and A=1 can be a number of allocations for a transmission for subband based PMI/CQI feedback. Alternatively, the allocation can be A>1 number of allocations for a transmission for wideband based PMI/CQI feedback.

In another example for a multi-cell environment, the processor 714 can be further configured to: Generate a constant phase shift for a set of $m_t$ orthogonal vectors to generate a set of $m_t$ constant phase shift orthogonal vectors for a neighboring cell when the set of $m_t$ orthogonal vectors is used for a local cell; or generate a mapping permutation between the set of orthogonal pilots and the set of orthogonal vectors for a neighboring cell when a mapping configuration between the set of orthogonal pilots and the set of orthogonal vectors is used for a local cell.

In another configuration, the processor 714 can be further configured to rotate a set of $m_t$ orthogonal vectors based on a rotation sequence every specified number of subframes. Each set of orthogonal vectors can generate a set of transmission beam directions that differ from other sets of orthogonal vectors.

The wireless device 720 (e.g., UE) can include a transceiver 724 and a processor 722. The wireless device (i.e., device) can be configured to generate an improved signal-to-interference-plus-noise ratio (SINR) from a set of orthogonal reference signals (RSs), as described in 500 of FIG. 13.

Figure 16:
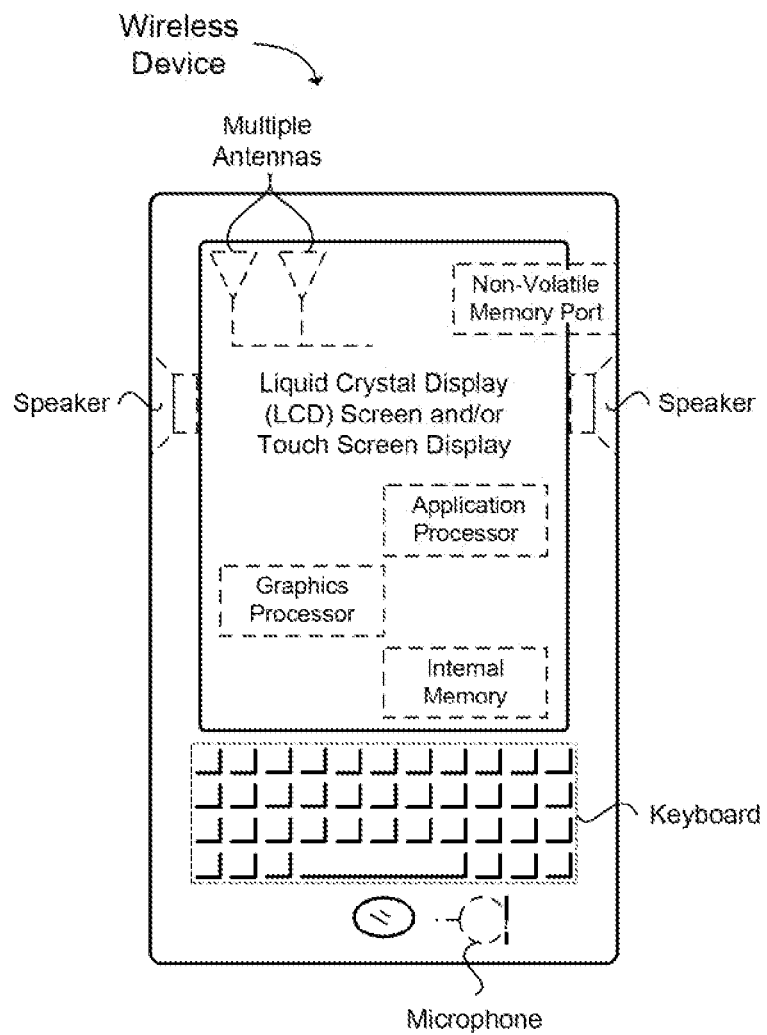
FIG. 16 illustrates a diagram of a wireless device (e.g., UE) in accordance with an example.

FIG. 16 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 16 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e. timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for providing beam selection using orthogonal beamforming vectors at a node, comprising:
generating a set of orthogonal beamforming vectors;
generating a set of orthogonal reference signals (RSs);
mapping the set of orthogonal RSs to beams using the set of orthogonal beamforming vectors;
receiving a quantized maximum signal-to-interference-plus-noise ratio (S1NR) from each of a plurality of user equipments (UEs) and a reference signal (RS) index for each quantized maximum SINR, wherein the RS index represents a beam for each UE with a best SINR for the set of orthogonal RSs, the quantized maximum SINR is received in a channel quality indicator (CQI) for each UE, and the RS index is determined by a precoding matrix indicator (PMI) received from each UE;
scheduling downlink resources for each beam using a UE with a highest quantized maximum SINR relative to other UEs; and
transmitting data using a beam to the UE with the highest quantized maximum SINR for the beam relative to the other UEs; wherein:
the SINR is represented by $$SINR_{k,m} = \frac{|H_k \phi_m|^2}{\frac{1}{SNR_p} + \sum_{i \neq m} |H_k \phi_i|^2},$$

the maximum SINR is represented by $\max_{m=1, \ldots, M} SINR_{k,m}$, the quantized maximum SINR is received in a channel quality indicator (CQI), and the reference signal index is represented by m, where $|H_k \phi_m|^2$ represents a received signal power at a UE for a RS with the reference signal index m, $\Sigma_{i \neq m} |H_k \phi_i|^2$ represents a received signal power at the UE for the other RSs in the set of orthogonal RSs, the $SNR_p$ is a signal-to-noise ratio (SNR) of received RSs in the set of orthogonal RSs, $H_k$ is an channel vector of the received RSs for the UE k, M is a number of transmit antennas by the node and m=1, 2, . . . , M, $\phi_m$ is a m-th precoding vector in an orthogonal set, and $\phi_i$ is an i-th precoding vector in the orthogonal set.

2. The method of claim 1, wherein mapping the set of orthogonal RSs to beams further comprises:
precoding a set of modulation symbols by orthogonal basis functions, wherein the orthogonal basis functions use the orthogonal beamforming vectors, and the set of orthogonal RSs are channel state information RSs (CSI-RSs).

3. The method of claim 1, further comprising:
transmitting the orthogonal RSs in a beam to a user equipment (UE).

4. The method of claim 1, further comprising:
recursively generating a second set of orthogonal beamforming vectors, wherein the second set of orthogonal beamforming vectors differs from a first set of orthogonal beamforming vectors;
generating another set of orthogonal reference signals (RSs); and
mapping the other set of orthogonal RSs to other beams using the other set of orthogonal beamforming vectors, wherein the other beams differ in direction from first beams generated.

5. At least one non-transitory machine readable storage medium comprising a plurality of instructions adapted to be executed to implement the method of claim 1.

6. A user equipment (UE) operable to generate an improved signal-to-interference-plus-noise ratio (SINR) from a set of orthogonal reference signals (RSs), having computer circuitry configured to:
receive a set of orthogonal RSs from a node, wherein each reference signal represents a transmission beam direction;
calculate a SINR for each of the RSs in the set of orthogonal RSs to form a set of SINR;
select a maximum SINR from the set of SINR; and
quantize the maximum SINR for the set of SINR, wherein the SINR is represented by $$SINR_{k,m} = \frac{|H_k \phi_m|^2}{\frac{1}{SNR_p} + \sum_{i \neq m} |H_k \phi_i|^2},$$

the maximum SINK is represented by $\max_{m=1, \ldots, M} SINR_{k,m}$, the quantized maximum SINR is transmitted in a channel quality indicator (CQI), and the reference signal index is represented by m, where $|H_k \phi_m|^2$ represents a received signal power for a RS with the reference signal index m, $\Sigma_{i \neq m} |H_k \phi_i|^2$ represents a received signal power for the other RSs in the set of orthogonal RSs, the $SNR_p$ is the a signal-to-noise ratio (SNR) of received RSs in the set of orthogonal RSs, $H_k$ is a estimated channel vector of the received RSs for the UE k, M is a number of transmit antennas by the node and m=1, 2, . . . , M, $\phi_m$ is a m-th precoding vector in an orthogonal set, and $\phi_i$ is an i-th precoding vector in the orthogonal set.

7. The computer circuitry of claim 6, wherein the computer circuitry is further configured to:
transmit the quantized maximum SINR and a reference signal index for the quantized maximum SINR to the node.

8. The computer circuitry of claim 7, wherein computer circuitry configured to receive the set of orthogonal RSs; calculate a SINR for each of the RS; select a maximum SINR; quantize the maximum SINR; and transmit the quantized maximum SINR and the reference signal index, is further configured to, for A*S*R<N, where the RSs are channel state information RSs (CSI-RSs), R is the CSI-RS available in each physical resource block (PRB), S is the number of PRBs in an allocation, A is the number of allocations for a transmission, and N is a total number of beam transmissions for M transmit antennas at the node:
recursively receive the set of orthogonal RSs for each allocation, wherein the set of orthogonal RSs is mapped to S*R transmission beams, and A allocations are received;
calculate a precoding matrix indicator (PMI) and a channel quality indicator (CQI) for the maximum SINR in each allocation based on the S*R transmission beam activated in the allocation;
select a maximum PMI and a maximum CQI from the A allocations; and
transmit the maximum PMI and the maximum CQI to the node.

9. The computer circuitry of claim 7, wherein computer circuitry configured to receive the set of orthogonal RSs; calculate a SINR for each of the RS; select a maximum SINR; quantize the maximum SINR; and transmit the quantized maximum SINR and the reference signal index, is further configured to, for A*S*R=N, where the RSs are channel state information RSs (CSI-RSs), R is the CSI-RS available in each physical resource block (PRB), S is the number of PRBs in an allocation, A is the number of allocations for a transmission, and N is a total number of beam transmissions for M transmit antennas at the node:
receive the set of orthogonal RSs for an allocation, wherein the set of orthogonal RSs is mapped to A*S*R transmission beams;
calculate a maximum precoding matrix indicator (PMI) and a maximum channel quality indicator (CQI) for the maximum SINR in the allocation based on the A*S*R transmission beam activated in the allocation; and
transmit the maximum PMI and the maximum CQI to the node.

10. The computer circuitry of claim 7, wherein computer circuitry configured to receive the set of orthogonal RSs; calculate a SINR for each of the RS; select a maximum SINR; quantize the maximum SINR; and transmit the quantized maximum SINR and the reference signal index, is further configured to, for A*S*R>N, where the RSs are channel state information RSs (CSI-RSs), R is the CSI-RS available in each physical resource block (PRB), S is the number of PRBs in an allocation, A is the number of allocations for a transmission, and N is a total number of beam transmissions for M transmit antennas at the node:
receive the set of orthogonal RSs for an allocation, wherein the set of orthogonal RSs is mapped to A*S*R transmission beam directions, and at least two RSs in the set of orthogonal RSs are mapped to one of the transmission beams;
calculate a maximum precoding matrix indicator (PMI) and a maximum channel quality indicator (CQI) for the maximum SINR in the allocation based on the A*S*R transmission beam activated in the allocation, wherein one of the SINRs is calculated from the at least two RSs; and
transmit the maximum PMI and the maximum CQI to the node.

11. The computer circuitry of claim 6, wherein the computer circuitry is further configured to:
receive a second set of orthogonal RSs from the node, wherein each reference signal represents a transmission beam direction, the second set of orthogonal RSs differs from the set of orthogonal RSs, and at least one transmission beam direction represented in the second set of orthogonal RSs is not in the set of orthogonal RSs;
calculate the SINR for each of the RSs in the second set of orthogonal RSs to form a second set of SINR;
select a maximum SINR from the second set of SINR; and
quantize the maximum SINR for the second set.

12. The computer circuitry of claim 6, wherein computer circuitry configured to receive the set of orthogonal RSs from the node is further configured to:
multiple-input and multiple-output (MIMO) decode a demodulated RS that is precoded by the node.

13. The computer circuitry of claim 6, wherein the computer circuitry is further configured to: identify each beam index for the RS by a RS to beam mapping.

14. The computer circuitry of claim 6, wherein computer circuitry configured to calculate a SINR for each of the RS is further configured to, for more than four beams in each physical resource block (PRB) pair, where the RSs are channel state information RSs (CSI-RSs):
measure reference signal received power (RSRP) for each CSI-RS group including CSI-RSs for more than four beams;
de-spread with a length-2 cover to resolve code division multiplexing (CDM) between two beam indices when RSRP is greater than a floor noise threshold;
identify two beam indexes for at least one of the CSI-RS groups; and
calculate power for both beams represented by the indexes two beam indexes.

15. The computer circuitry of claim 6, wherein the UE includes an antenna, a touch sensitive display screen, a speaker, a microphone, a graphics processor, an application processor, internal memory, or a non-volatile memory port.

16. A node configured for random beamforming (RBF), comprising:
a transceiver to:
receive, from each of a plurality of user equipments (UEs), a quantized maximum signal-to-interference-plus-noise ratio (SINR) and a pilot index for each quantized maximum SINR, wherein the pilot index represents a beam for each UE with a best SINR for a set of orthogonal pilots, the quantized maximum SINR is transmitted in a channel quality indicator (CQI), and the pilot index is determined by a transmitted precoding matrix indicator (PMI); and
a processor to:
schedule a downlink transmission for each beam using UEs with a highest quantized maximum SINR relative to other UEs; and
wherein the transceiver is further configured to:
transmit data via a set of transmit antennas using a beam to the UEs with the highest quantized maximum SINR for the beam relative to other UEs, the SINR is represented by $$SINR_{k,m} = \frac{|H_k \phi_m|^2}{\frac{1}{SNR_p} + \sum_{i \neq m} |H_k \phi_i|^2},$$

the maximum SINR is represented by $\max_{m=1, \ldots, M} SINR_{k,m}$, the quantized maximum SINR is received in a channel quality indicator (CQI), and the reference signal index is represented by m, where $|H_k \phi_m|^2$ represents a received signal power at a UE for a RS with the reference signal index m, $\Sigma_{i \neq m} |H_k \phi_i|^2$ represents a received signal power at the UE for the other RSs in the set of orthogonal RSs, the $SNR_p$ is the a signal-to-noise ratio (SNR) of received RSs in the set of orthogonal RSs, $H_k$ is an channel vector of the received RSs for the UE k, M is a number of transmit antennas by the node m=1, 2, ..., M, $\phi_m$ is a m-th precoding vector in an orthogonal set, and $\phi_i$ is an i-th precoding vector in the orthogonal set.

17. The node of claim 16, wherein:
the processor is further configured to:
select an allocation for pilots used to generate an N total number of beams via M transmit antennas, wherein the allocation is within a coherence time and a coherence bandwidth, the coherence time, or the coherence bandwidth; and the coherence time is a time duration or number of subframes over which a channel impulse response varies less than a coherence time threshold, and coherence bandwidth is a range of frequencies or physical resource blocks (PRBs) over which the channel impulse response varies less than a coherence bandwidth threshold.

18. The node of claim 17, wherein for A*S*R<N, where the orthogonal pilots are channel state information RSs (CSI-RSs), R is the CSI-RS available in each PRB, S is the number of PRBs in an allocation, A is the number of allocations for a transmission, and N is the total number of beam transmissions for the M transmit antennas:
the processor is further configured to:
recursively generate a set of $m_t$ orthogonal vectors for A number of allocations, wherein $m_t \leq M$ for each allocation;
recursively generate the set of orthogonal CSI-RSs for each allocation; and
map each set of orthogonal CSI-RSs to S*R transmission beams using the set of orthogonal vectors for the A number of allocations; and
the transmitter is further configured to:
transmit each set of orthogonal CSI-RSs to the S*R transmission beams for the A number of allocations, wherein the quantized maximum SINR and the pilot index is for the N total number of beam transmissions.

19. The node of claim 17, wherein for A*S*R=N, where the orthogonal pilots are channel state information RSs (CSI-RSs), R is the CSI-RS available in each PRB, S is the number of PRBs in an allocation, A is the number of allocations for a transmission, and N is the total number of beam transmissions for the M transmit antennas:
the processor is further configured to:
generate a set of $m_t$ orthogonal vectors for an allocation, wherein $m_t \leq M$ for the allocation;
generate the set of orthogonal CSI-RSs for the allocation; and
map the set of orthogonal CSI-RSs to A*S*R transmission beams using the set of orthogonal vectors for the allocation; and
the transmitter is further configured to:
transmit each set of orthogonal CSI-RSs to the A*S*R transmission beams for the allocation, wherein the quantized maximum SINR and the pilot index is for the A*S*R number of beam transmissions.

20. The node of claim 17, wherein for A*S*R>N, where the orthogonal pilots are channel state information RSs (CSI-RSs), R is the CSI-RS available in each PRB, S is the number of PRBs in an allocation, A is the number of allocations for a transmission, and N is the total number of beam transmissions for the M transmit antennas:
the processor is further configured to:
generate a set of $m_t$ orthogonal vectors for an allocation, wherein $m_t \leq M$ for the allocation;
generate the set of orthogonal CSI-RSs for the allocation; and
map the set of orthogonal CSI-RSs to A*S*R transmission beams using the set of orthogonal vectors for the allocation, wherein at least two CSI-RSs in the set of orthogonal RSs are mapped to one of the transmission beams; and
the transmitter is further configured to:
transmit each set of orthogonal CSI-RSs to the A*S*R transmission beams for the allocation, wherein the quantized maximum SINR and the pilot index is for the A*S*R number of beam transmissions.

21. The node of claim 17, wherein the allocation is a subband and A=1 is a number of allocations for a transmission for subband based PMI/CQI feedback; or the allocation is A>1 number of allocations for a transmission for wideband based PMI/CQI feedback.

22. The node of claim 19, wherein for a multi-cell environment:
the processor is further configured to:
generate a constant phase shift for a set of $m_t$ orthogonal vectors to generate a set of $m_t$ constant phase shift orthogonal vectors for a neighboring cell when the set of $m_t$ orthogonal vectors is used for a local cell; or
generate a mapping permutation between the set of orthogonal pilots and the set of orthogonal vectors for a neighboring cell when a mapping configuration between the set of orthogonal pilots and the set of orthogonal vectors is used for a local cell.

23. The node of claim 16, wherein:
the processor is further configured to:
rotate a set of $m_t$ orthogonal vectors based on a rotation sequence every specified number of subframes, wherein each set of orthogonal vectors generates a set of transmission beam directions that differ from other sets of orthogonal vectors.

24. The node of claim 16, wherein the node includes M transmit antennas, where M>8 transmit antennas and the node is selected from the group consisting of a base station (BS), a Node B (NB), an evolved Node B (eNB), a baseband unit (BBU), a remote radio head (RRH), a remote radio equipment (RRE), a remote radio unit (RRU), and a central processing module (CPM).

* * * * *